US012701633B2

(12) United States Patent　　Ashraf et al.

(10) Patent No.:　　US 12,701,633 B2
(45) Date of Patent:　　Aug. 4, 2026

(54) EXTENDED CONTIGUOUS SENSING DURING SIDELINK DISCONTINUOUS RECEPTION (SL-DRX)

(71) Applicant: Telefonaktiebolaget LM Ericsson (publ), Stockholm (SE)

(72) Inventors: Shehzad Ali Ashraf, Munich (DE); Hieu Do, Järfälla (SE); Jose Angel Leon Calvo, Munich (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

(21) Appl. No.: 18/696,232

(22) PCT Filed: Sep. 30, 2022

(86) PCT No.: PCT/SE2022/050880
§ 371 (c)(1),
(2) Date: Mar. 27, 2024

(87) PCT Pub. No.: WO2023/055284
PCT Pub. Date: Apr. 6, 2023

(65) Prior Publication Data
US 2024/0407045 A1　　Dec. 5, 2024

Related U.S. Application Data

(60) Provisional application No. 63/251,374, filed on Oct. 1, 2021, provisional application No. 63/250,731, filed on Sep. 30, 2021.

(51) Int. Cl.
*H04W 76/28*　　(2018.01)

(52) U.S. Cl.
CPC ................................. *H04W 76/28* (2018.02)

(58) Field of Classification Search
CPC ............................. H04W 76/14; H04W 76/28
See application file for complete search history.

(56) References Cited

U.S. PATENT DOCUMENTS

| | | | |
|---|---|---|---|
| 2020/0170002 A1 | 5/2020 | Lee et al. | |
| 2021/0314966 A1* | 10/2021 | Hui | H04W 72/56 |

(Continued)

FOREIGN PATENT DOCUMENTS

| | | |
|---|---|---|
| CN | 113225840 A | 8/2021 |
| WO | 2022053627 A1 | 3/2022 |
| WO | 2022243429 A1 | 11/2022 |

OTHER PUBLICATIONS

"3rd Generation Partnership Project; Technical Specification Group Radio Access Network; NR; Physical layer procedures for data (Release 16)", 3GPP TS 38.214 V16.7.0, Sep. 2021, pp. 1-172.

(Continued)

*Primary Examiner* — Kashif Siddiqui
(74) *Attorney, Agent, or Firm* — Murphy, Bilak & Homiller, PLLC

(57) ABSTRACT

Embodiments include methods for a user equipment (UE) configured for sidelink (SL) communication with one or more other UEs. Such methods include, while operating in SL discontinuous reception (SL-DRX) comprising a plurality of active and inactive times during which the UE's SL receiver is active and inactive respectively, receiving at time n a trigger to select resources for a SL transmission and extending a contiguous partial sensing (CPS) window after the trigger when a portion of an active time is less than a first duration. The portion of the active time corresponds to an overlap of the active time with a remaining packet delay budget associated with the SL transmission. The first duration comprises a minimum CPS window (CPSWmin) followed by a minimum resource selection window (RSWmin). Such methods also include during the portion of the active (Continued)

5GC　198

NG　102　　　　NG　152

NG-RAN
199 gNB　gNB-CU　100
110
122　132
F1　F1

120　130
gNB-DU　gNB-DU

Xn
140 gNB　gNB-CU　150

F1　F1 gNB-DU　gNB-DU time performing CPS of resources and/or selection of resources for the SL transmission.

20 Claims, 11 Drawing Sheets

(56) References Cited

U.S. PATENT DOCUMENTS

| | | | | |
|---|---|---|---|---|
| 2022/0061095 A1* | 2/2022 | Xue | | H04W 80/02 |
| 2022/0132568 A1* | 4/2022 | Sarkis | | H04W 74/0808 |
| 2023/0120774 A1* | 4/2023 | Xue | | H04W 72/1263 |
| | | | | 370/336 |
| 2023/0319950 A1 | 10/2023 | Do et al. | | |
| 2024/0039680 A1* | 2/2024 | Selvanesan | | H04L 5/0055 |

OTHER PUBLICATIONS

"Discussion on resource allocation for power saving", 3GPP TSG RAN WG1 Meeting #106-e, R1-2107528, e-Meeting, Aug. 16-27, 2021, pp. 1-27.

"Discussion on sidelink resource allocation for power saving", 3GPP TSG RAN WG1 #106-e, R1-2107879, e-Meeting, Aug. 16-27, 2021, pp. 1-20.

"On resource allocation for power saving", 3GPP TSG RAN WG1 Meeting #106-e, R1-2106909, e-Meeting, Aug. 16-27, 2021, pp. 1-12.

"Resource allocation procedures for power saving", 3GPP TSG RAN WG1 #104b-e, R1-2103704, e-Meeting, Apr. 12-20, 2021, pp. 1-16.

"Resource allocation procedures for power saving", 3GPP TSG RAN WG1 #106-e, R1-2108136, e-Meeting, Aug. 16-27, 2021, pp. 1-11.

"Resource allocation procedures for power saving", 3GPP TSG RAN WG1 #106bis-e, R1-2110339, e-Meeting, Oct. 11-19, 2021, pp. 1-13.

"3GPP TS 38.213 V16.7.0", 3rd Generation Partnership Project; Technical Specification Group Radio Access Network; NR; Physical layer procedures for control (Release 16), Sep. 2021, pp. 1-188.

"3rd Generation Partnership Project; Technical Specification Group Radio Access Network; NR; Medium Access Control (MAC) protocol specification (Release 16)", 3GPP TS 38.321 V16.6.0, Sep. 2021, pp. 1-158.

"3rd Generation Partnership Project; Technical Specification Group Radio Access Network; NR; Physical layer procedures for data (Release 16)", 3GPP TS 38.214 V16.1.0, Mar. 2020, pp. 1-151.

"3rd Generation Partnership Project; Technical Specification Group Radio Access Network; NR; Radio Resource Control (RRC) protocol specification (Release 16)", 3GPP TS 38.331 V16.6.0, Sep. 2021, pp. 1-961.

"Discussion on physical layer design considering sidelink DRX operation", 3GPP TSG RAN WG1 #103-e, R1-2007897, E-Meeting, Oct. 26-Nov. 13, 2020, pp. 1-15.

"New WID on NR sidelink enhancement", 3GPP TSG RAN Meeting #86, RP-193231, (revision of RP-193134), Sitges, Spain, Dec. 9-12, 2019, pp. 1-6.

* cited by examiner

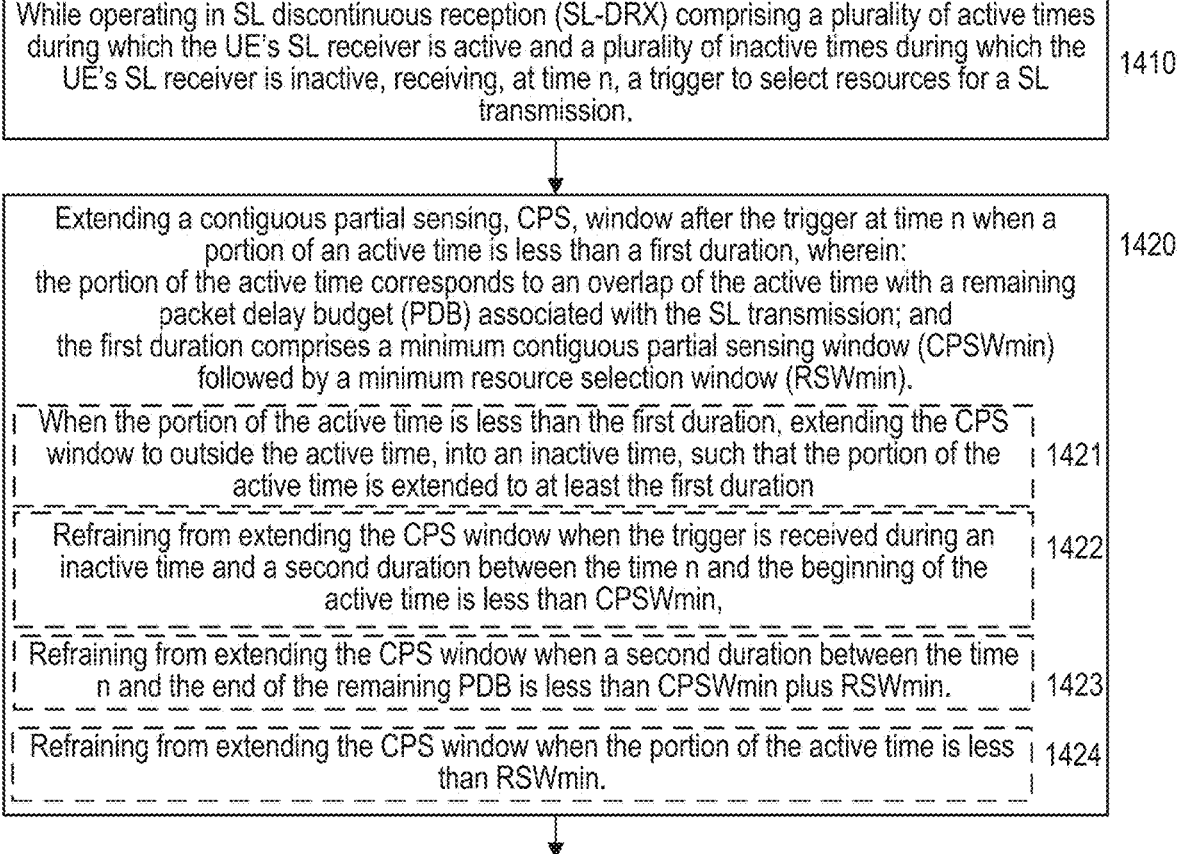

While operating in SL discontinuous reception (SL-DRX) comprising a plurality of active times during which the UE's SL receiver is active and a plurality of inactive times during which the UE's SL receiver is inactive, receiving, at time n, a trigger to select resources for a SL transmission.                                                                                1410

Extending a contiguous partial sensing, CPS, window after the trigger at time n when a portion of an active time is less than a first duration, wherein:                        1420
the portion of the active time corresponds to an overlap of the active time with a remaining packet delay budget (PDB) associated with the SL transmission; and
the first duration comprises a minimum contiguous partial sensing window (CPSWmin) followed by a minimum resource selection window (RSWmin).

When the portion of the active time is less than the first duration, extending the CPS window to outside the active time, into an inactive time, such that the portion of the active time is extended to at least the first duration                                1421

Refraining from extending the CPS window when the trigger is received during an inactive time and a second duration between the time n and the beginning of the active time is less than CPSWmin,                                                    1422

Refraining from extending the CPS window when a second duration between the time n and the end of the remaining PDB is less than CPSWmin plus RSWmin.           1423

Refraining from extending the CPS window when the portion of the active time is less than RSWmin.                                                                 1424

Performing at least one of the following during the portion of the active time: contiguous partial sensing (CPS) of resources, and selection of resources for the SL transmission.        1430

*FIG. 14*

EXTENDED CONTIGUOUS SENSING DURING SIDELINK DISCONTINUOUS RECEPTION (SL-DRX)

TECHNICAL FIELD

The present disclosure generally relates to wireless networks and devices, and more specifically to user equipment (UE) that can communicate with other UEs directly rather than (or in addition to) indirect communication via a radio access network (RAN).

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such as controlling the operation of DUs. Each DU is a logical node that hosts lower-layer protocols and can include, depending on the functional split, various subsets of the gNB functions. As such, each of the CUS and DUs can include various circuitry needed to perform their respective functions, including processing circuitry, transceiver circuitry (e.g., for communication), and power supply circuitry.

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

Sidelink (SL) is a type of device-to-device (D2D) communication whereby UEs can communicate with each other directly rather than indirectly via a 3GPP RAN. The first 3GPP standardization of SL was in LTE Rel-12 targeting public safety use cases. Since then, various enhancements have been introduced to broaden the use cases that could benefit from D2D technology. For example, the D2D extensions in LTE Rel-14 and Rel-15 include supporting vehicle-to-everything (V2X) communication.

3GPP Rel-16 specifies the NR SL interface. NR Rel-16 SL targets advanced V2X services, which can be categorized into four use case groups: vehicles platooning, extended sensors, advanced driving, and remote driving. The advanced V2X services require a new SL in order to meet the stringent requirements in terms of latency and reliability. The NR SL is designed to provide higher system capacity and better coverage, and to allow for extension to support the future development of even more advanced V2X services and other related services.

National security and public safety (NSPS) services often need to operate without (or with partial) RAN coverage, such as during indoor firefighting, forest firefighting, earthquake rescue, sea rescue, etc. In these scenarios, network coverage extension is a crucial enabler for NSPS. 3GPP Rel-17 includes a study item for coverage extension for SL-based communication, including UE-to-network relay for cellular coverage extension and UE-to-UE relay for SL coverage extension. Additionally, improving performance of power-limited UEs (e.g., pedestrian UEs, first responder UEs, etc.) and improving the performance using resource coordination are also important goals for the Rel-17 work.

Broadcast, groupcast, and unicast transmissions are desirable for the services targeted by NR SL. In groupcast (or multicast), the intended receiver of a message consists of only a subset of the possible recipients in proximity to the transmitter, whereas a unicast message is intended for only one recipient in proximity to the transmitter. For example, in the platooning service there are certain messages that are only of interest of the members of the platoon, for which groupcast can be used. Unicast is a natural fit for use cases involving only a pair of vehicles. Furthermore, NR SL is designed such that it is operable both with and without network coverage and with varying degrees of interaction between the UEs (user equipment) and the RAN, including support for standalone, network-less operation.

Two types of resource allocation modes are supported for NR SL between UEs. In NR SL resource allocation mode 1, all SL transmissions between UEs are scheduled by the network (e.g., a serving gNB) using a configured grant or a dynamic grant. The network (e.g., serving gNB) can provide a UE with a configured SL grant via radio resource control (RRC) configuration. Configured SL grants typically allocate resources having a periodic, semi-persistent pattern. Two types of configured SL grants are available, i.e., types 1 and 2. In type 2, the network can activate/deactivate the RRC-configured grant using DCI signaling. In other cases, the network may select the resources used for transmission but may give the transmitting SL UE some freedom to select some of the transmission parameters, possibly with some restrictions In SL resource allocation mode 2, the resource allocation is performed by UE itself, e.g., autonomously based on sensing the carrier/resource pool for availability. In particular, the UE determines SL resource pool(s) by decoding sidelink control information (SCI) received from other UEs and/or by energy sensing, and selects a set of idle/available resources to use for its SL transmission. In this mode, there may be no intervention by the network (e.g., out of coverage, unlicensed carriers without a network deployment, etc.) or very minimal intervention by the network (e.g., configuration of pools of resources, etc.).

To summarize, SL resource allocation mode 2 is based on reservation of future resources and sensing-based resource allocation. Reservation of future resources is done so that a sending UE also notifies the receiving UE(s) about its intention to transmit using certain time-frequency resources at a later point in time. For example, a UE transmitting at time T informs the receivers that it will transmit using the same frequency resources at time T+100 ms. This is referred to as a "booking message".

Resource reservation allows a UE to predict the utilization of the radio resources in the future. For example, a UE can obtain information about potential future transmissions by listening to the current transmissions of another UE. This information can be used by the UE to avoid collisions when selecting its own resources. As a more specific example, a UE predicts the future utilization of the radio resources by reading received booking messages and then schedules its transmissions to avoid using the same resources. This is known as sensing-based resource selection.

In cellular communication, discontinuous reception (DRX) refers to mechanisms that allow a node (typically a UE) to turn off at least part of its receiver circuitry when no incoming data is expected, which helps reduce node energy consumption. Broadly speaking, a UE in DRX has an Active Time (also referred to as Active Time state or ACTIVE state) during which it is expected to receive and process incoming transmissions as appropriate. For example, the UE is expected to decode downlink (DL) control channels, process grants, etc. Typically, UEs that are not in Active Time turn off some of their components and enter a low-energy (i.e., sleep) mode.

SUMMARY

In V2X, UEs are typically mounted in a vehicle and have no significant power restrictions. In contrast, NSPS use cases mostly involve handheld UEs for which energy efficiency is a concern. Accordingly, the Rel-17 Work Item on NR SL includes the study and specification of SL DRX mechanism as one of its objectives.

However, since a UE can only sense resources when its receiver is active, SL DRX can cause various problems, issues, and/or difficulties for the sensing procedures used by UEs in SL resource selection, e.g., in SL mode 2 (autonomous). For example, there can be insufficient time for resource sensing due to SL DRX Active Time restrictions.

Embodiments of the present disclosure provide specific improvements to SL operation of UEs, such as by providing, enabling, and/or facilitating solutions to overcome exemplary problems summarized above and described in more detail below.

Embodiments include methods (e.g., procedures) for a UE configured for SL communication with one or more other UEs in a wireless network.

These exemplary methods include, while operating in SL discontinuous reception (SL-DRX) comprising a plurality of active times during which the UE's SL receiver is active and a plurality of inactive times during which the UE's SL receiver is inactive, receiving, at a time n, a trigger to select resources for a SL transmission. These exemplary methods also include extending a contiguous partial sensing, CPS, window after the trigger at time n when a portion of an active time is less than a first duration. The portion of the active time corresponds to an overlap of the active time with a remaining PDB associated with the SL transmission, while the first duration comprises a minimum contiguous partial sensing window (CPSWmin) followed by a minimum resource selection window (RSWmin).

These exemplary methods can also include performing at least one of the following during the portion of the active time: contiguous partial sensing (CPS) of resources, and selection of resources for the SL transmission.

In some embodiments, extending the CPS window can include, when the portion of the active time is less than the first duration, extending the CPS window to outside the active time, into an inactive time, such that the portion of the active time is extended to at least the first duration. During the extended portion of the active time, CPS is performed for at least CPSWmin and selection of resources is performed after CPS for at least RSWmin.

In some embodiments, when the portion of the active time is not less than the first duration, CPS is performed for a duration of at least CPSWmin starting at the beginning of the portion of the active time while selection of resources is performed after CPS, for a duration of RSWmin until the end of the portion of the active time. In some of these embodiments, CPS is performed until the beginning of the selection of resources.

In other embodiments, when the portion of the active time is not less than the first duration, CPS is performed for a duration of CPSWmin starting at the beginning of the portion of the active time, while selection of resources is performed after CPS for a duration of at least RSWmin, until the end of the portion of the active time.

In other embodiments, when the portion of the active time is not less than the first duration, CPS is performed for a duration greater than CPSWmin, starting at the beginning of the portion of the active time. Also, selection of resources is performed after CPS for a duration greater than RSWmin, until the end of the portion of the active time.

In various embodiments summarized above, the selection of resources is based on the CPS (e.g., results or outcome).

In some embodiments, extending the CPS window when the portion of the active time is less than the first duration can include refraining from extending the CPS window when the trigger is received during an inactive time and a second duration between the time n and the beginning of the active time is less than CPSWmin. During the portion of the active time, CPS is not performed and resources for the SL transmission are selected randomly from a pool of SL resources.

In other embodiments, extending the CPS window when the portion of the active time is less than the first duration can include refraining from extending the CPS window when a second duration between the time n and the end of the remaining PDB is less than CPSWmin plus RSWmin. During the portion of the active time, CPS is not performed and resources for the SL transmission are selected randomly from a pool of SL resources.

In variants of these embodiments, the random selection of resources for the SL transmission is further based on the UE's channel occupancy ratio (CR) not exceeding a threshold. In some embodiments, extending the CPS window when the portion of the active time is less than the first duration can include refraining from extending the CPS window when the portion of the active time is less than RSWmin. During the portion of the active time, CPS is not performed and resources for the SL transmission are selected randomly from a pool of SL resources. In some of these embodiments, the selection of resources is performed randomly regardless of whether the CPS window can be extended such that CPS can be performed for at least CPSWmin.

In some embodiments, CPSWmin is based on one or more of the following: a packet priority level associated with the SL transmission, and a channel busy ratio (CBR) requirement. In some embodiments, RSWmin is based on one or more of the following: a packet priority level associated with the SL transmission, and a CBR requirement.

Other embodiments include UEs (e.g., wireless devices) that are configured to perform operations corresponding to any of the exemplary methods described herein. Other embodiments include non-transitory, computer-readable media storing computer-executable instructions that, when executed by processing circuitry, configure such UEs to perform operations corresponding to any of the exemplary methods described herein.

These and other embodiments described herein can balance energy savings of SL-DRX with the need for reliable sensing to facilitate SL resource selection. Embodiments can improve reliability of the SL transmission due to the extended sensing operation in case the UE is in DRX, reduce energy consumption compared to a full-sensing operation, and trigger extended sensing operation as needed. Embodiments also provide a common UE behavior regarding the minimum contiguous sensing window which must be met irrespective of SL-DRX configuration or UE implementation, thereby improving overall system performance by reducing collisions caused by inadequate sensing.

These and other objects, features, and advantages of embodiments of the present disclosure will become apparent upon reading the following Detailed Description in view of the Drawings briefly described below.

BRIEF DESCRIPTION OF THE DRAWINGS

FIG. 14 shows a flow diagram of an exemplary method (e.g., procedure) for a UE (e.g., wireless device), according to various embodiments of the present disclosure.

DETAILED DESCRIPTION

Figure 1:
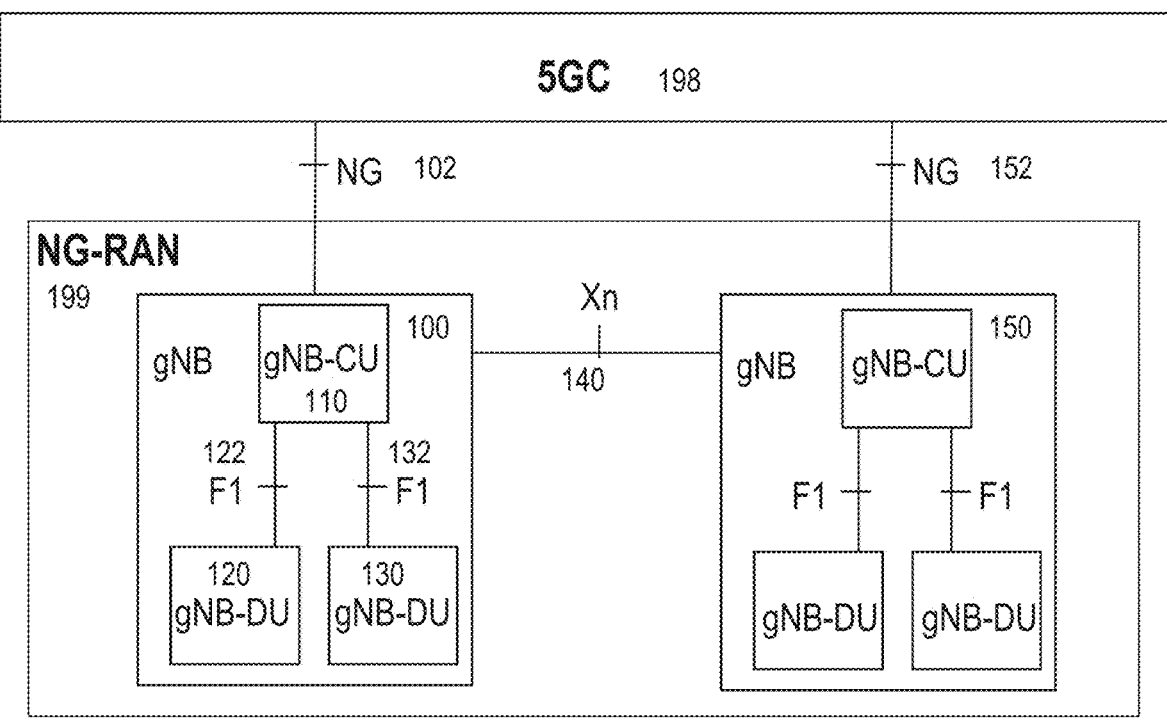
FIG. 1 illustrates a high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that is capable, configured, arranged and/or operable to communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with the term "user equipment" (or "UE" for short), with both of these terms having a different meaning than the term "network node".

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 2:
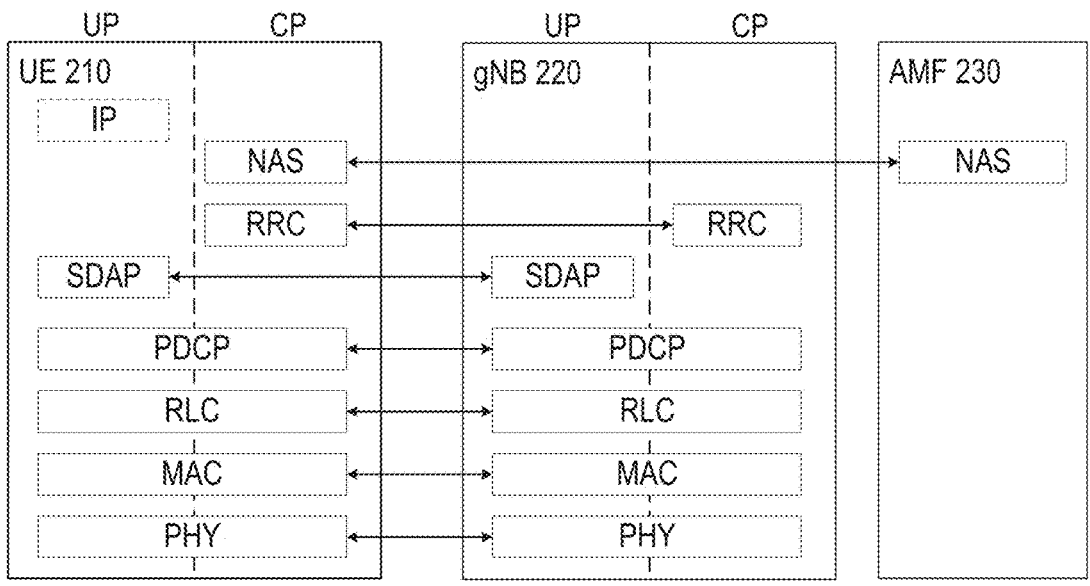
FIG. 2 shows an exemplary configuration of NR user plane (UP) and control plane (CP) protocol stacks.

FIG. 2 shows an exemplary configuration of NR user plane (UP) and control plane (CP) protocol stacks between a UE (210), a gNB (220), and an access and mobility management function (AMF, 230) in the 5GC. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. The Service Data Adaptation Protocol (SDAP) layer handles quality-of-service (QOS) including mapping between QoS flows and Data Radio Bearers (DRBs) and marking QoS flow identifiers (QFI) in UL and DL packets. The RLC layer transfers PDCP PDUs to the MAC through logical channels (LCH). RLC provides error detection/correction, concatenation, segmentation/reassembly, sequence numbering, reordering of data transferred to/from the upper layers. The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active times, an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

DRX functionality is also used by RRC_CONNECTED UEs. This allows a UE to turn off at least some of its receiver circuitry when no incoming data is expected, which helps reduce the energy consumption. When configured, the DRX functionality controls the expected UE behavior in terms of reception and processing of transmissions. Similar to RRC_IDLE DRX, RRC_CONNECTED DRX includes an Active Time (also referred to as Active Time state or ACTIVE state), in which the UE is expected to receive and process incoming transmissions as appropriate. For example, the UE is expected to decode the downlink (DL) control channels, process grants, etc. When the UE is not in Active Time (i.e., the UE is in Inactive Time), there is no expectation on the UE receiving and processing transmissions. That is, the base station cannot assume that the UE will be listening to DL transmissions. The DRX configuration defines the transitions between states. Note that a UE's RRC state is independent of its DRX state, such that a UE stays in its current RRC state when changing between DRX Active Time and Inactive Time.

Typically, UEs that are not in Active Time turn off some of their components and enter a reduced-energy (i.e., sleeping) mode. To ensure that the UE switches regularly to Active Time (i.e., wakes up), a DRX cycle is defined. This DRX cycle is controlled by two parameters: a periodicity, which controls how frequently the UE switches to Active Time; and a duration, which controls for how long the UE remains in active state each time it enters active state.

In addition to this basic cycle, the DRX procedures also define other conditions that may allow the UE to switch between Active Time and Inactive Time. For example, if a UE is expecting a retransmission from the gNB, the UE may enter Inactive Time (i.e., while the gNB prepares the retransmission) and then may enter Active Time (i.e., during a window in which the gNB may send the transmission).

Figure 3:
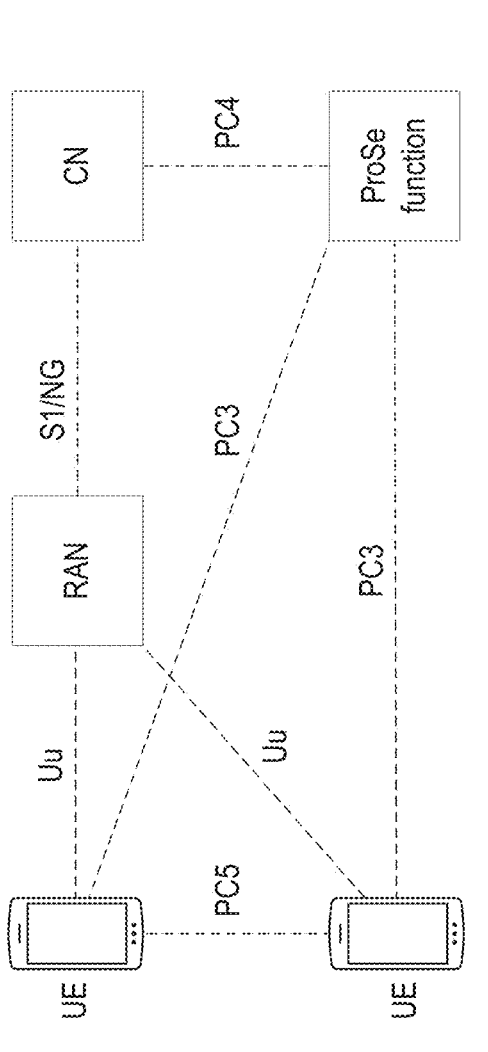
FIG. 3 shows an exemplary arrangement of interfaces between two V2X UEs and a RAN.

A vehicle-to-everything (V2X) UE can support unicast communication via the uplink/downlink radio interface (also referred to as "Uu") to a 3GPP RAN, such as the LTE Evolved-UTRAN (E-UTRAN) or the NG-RAN. A V2X UE can also support SL unicast over the PC5 interface. FIG. 3 shows an exemplary arrangement of interfaces between two V2X UEs and a RAN. In addition to Uu and PC5 interfaces, the V2X UEs can communicate with a ProSe (PROximity-based SErvices) function via respective PC3 interfaces. Communication with the ProSe function requires a UE to establish a connection with the RAN, either directly via the Uu interface or indirectly via PC5 and another UE's Uu interface. The ProSe function provides the UE various information for network related actions, such as service authorization and provisioning of PLMN-specific information (e.g., security parameters, group IDs, group IP addresses, out-of-coverage radio resources, etc.). FIG. 3 also shows a PC4 interface between the ProSe function and the core network (CN).

Figure 4:
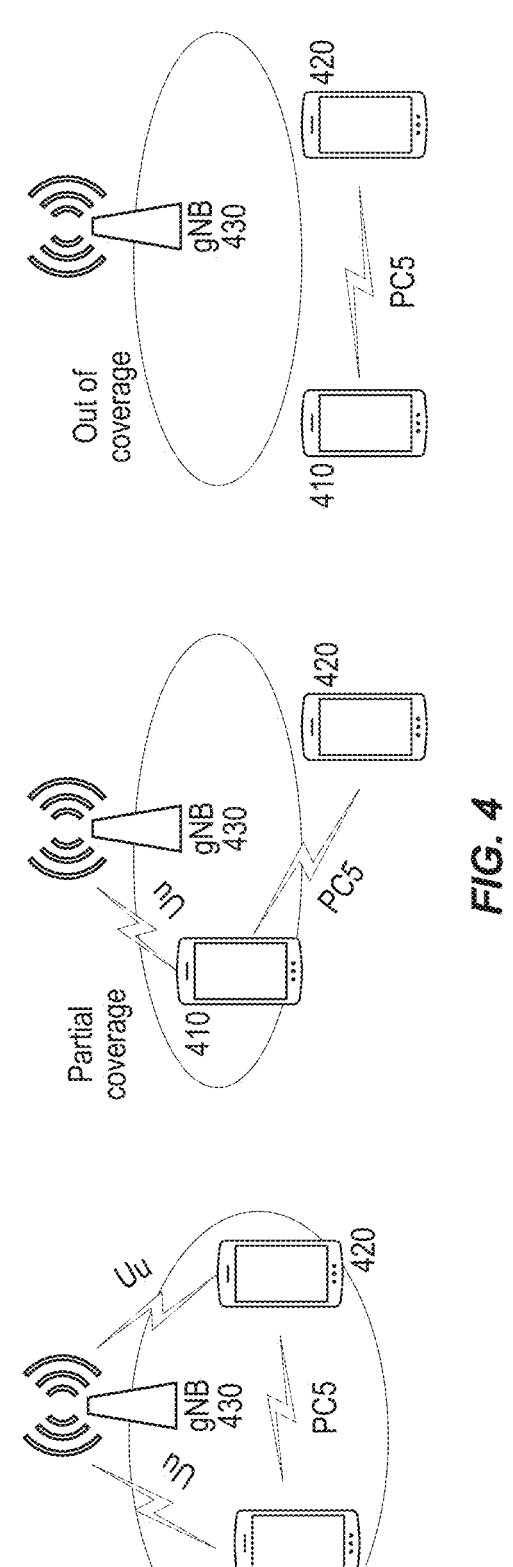
FIG. 4 shows three exemplary network coverage scenarios for two UEs and a gNB serving a cell.

FIG. 4 shows three exemplary network coverage scenarios for two UEs (410, 420) and a gNB (430) serving a cell. In the full coverage scenario (left), both UEs are in the coverage of the cell, such that they both can communicate with the gNB via respective Uu interfaces and directly with each other via the PC5 interface. In the partial coverage scenario (center), only one of the UEs is in coverage of the cell, but the out-of-coverage UE can still communicate with the gNB indirectly via the PC5 interface with the in-coverage UE. In the out-of-coverage scenario, both UEs can only communicate with each other via the PC5 interface.

In general, the term "SL standalone" refers to direct communication between two SL-capable UEs (e.g., via PC5) in which source and destination are the UEs themselves. In contrast, the term "SL relay" refers to indirect communication between a network node and a remote UE via a first interface (e.g., Uu) between the network node an intermediate (or relay) UE and a second interface (e.g., PC5) between the relay UE and the remote UE. In this case the relay UE is neither the source nor the destination.

In general, an "out-of-coverage UE" is one that cannot establish a direct connection to the network and must communicate via either SL standalone or SL relay. A "peer UE" refers to a UE that can communicate with the out-of-coverage UE via SL standalone or SL relay (in which case the peer UE is also a relay UE).

UEs that are in coverage can be configured (e.g., by a gNB) via RRC signaling and/or system information. Out-of-coverage UEs rely on a (pre-)configuration available in their SIMs. These pre-configurations are generally static but can be updated by the network when a UE is in coverage.

As briefly mentioned above, in SL resource allocation mode 2, the resource allocation is performed by UE itself, e.g., autonomously based on sensing the carrier/resource pool for availability. In particular, this mode uses distributed resource selection in which there is no central scheduling node. Mode 2 is based on two functionalities: reservation of future resources and sensing-based resource allocation. Reservation of future resources is done so that a sending UE also notifies the receiving UE(s) about its intention to transmit using certain time-frequency resources at a later point in time. For example, a UE transmitting at time T informs the receivers that it will transmit using the same frequency resources at time T+100 ms. This is referred to as a "booking message".

Resource reservation allows a UE to predict the utilization of the radio resources in the future. For example, a UE can obtain information about potential future transmissions by listening to the current transmissions of another UE. This information can be used by the UE to avoid collisions when selecting its own resources. As a more specific example, a UE predicts the future utilization of the radio resources by reading received booking messages and then schedules its transmissions to avoid using the same resources. This is known as sensing-based resource selection.

The sensing-based resource selection technique for NR Rel-16 SL is specified in 3GPP TS 38.214 (v16.1.0) and can be summarized in the following operations:

A UE senses the transmission medium during an interval [n-a, n-b], where n is a time reference, and $a>b\geq0$ define the duration of the sensing window. The length of the sensing window is (pre-)configurable.

Based on the sensing results, the UE predicts the future utilization of the transmission medium at a future time interval [n+T1, n+T2], where $T2>T1\geq0$. The interval [n+T1, n+T2] is the resource selection window.

The UE selects one or more time-frequency resources among the resources in the selection window [n+T1, n+T2] that are predicted/determined to be selectable (e.g., idle, usable, available, etc.).

Although sensing plays a key role in the SL resource selection, sensing also consumes significant energy. Thus, a Rel-17 enhancement for power-limited SL devices is partial sensing, which aims to reduce sensing time used by a UE while maintaining a decent level of performance. So far, 3GPP has agreed to support two types of partial sensing: periodic-based partial sensing (PBPS), which is a similar procedure as the one used in LTE; and continuous partial sensing (CPS), which is a new procedure in NR. Another alternative is random resource selection, where the UE selects resources randomly without sensing.

Figure 5A:
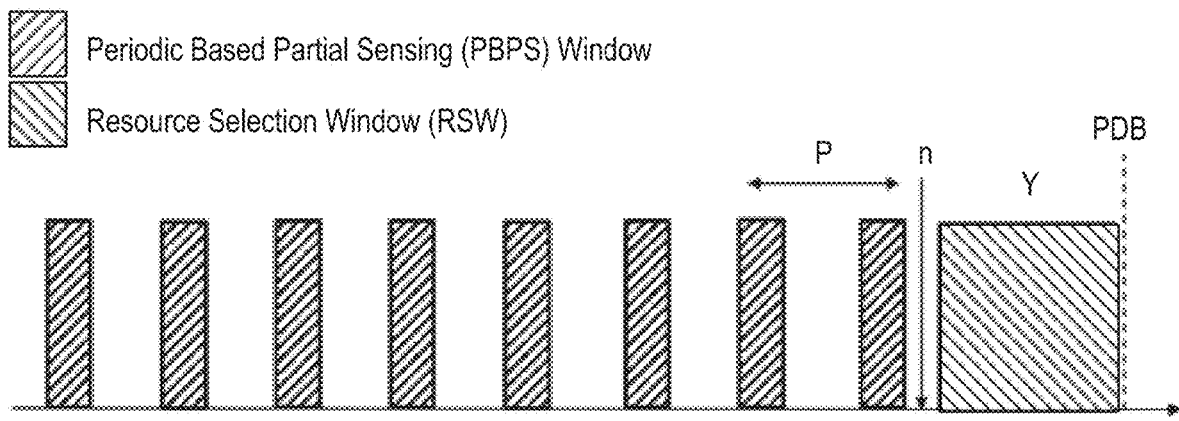
FIGS. 5A-B show examples of periodic-based partial sensing (PBPS) and contiguous partial sensing (CPS), respectively.

FIG. 5A shows an example of PBPS. In this example, the UE performs sensing during a subset of resources based on a set of periodicities, which are defined in the parameter sl-ResourceReservePeriodList. As shown in FIG. 5, the UE performs sensing during a subset of resources every P ms. Using this procedure, the UE reduces energy consumption relative to continuous sensing, but at the expense of an increase in the likelihood of collision because the UE is unable to collect complete channel occupancy information due to reduced sensing time.

Figure 5B:
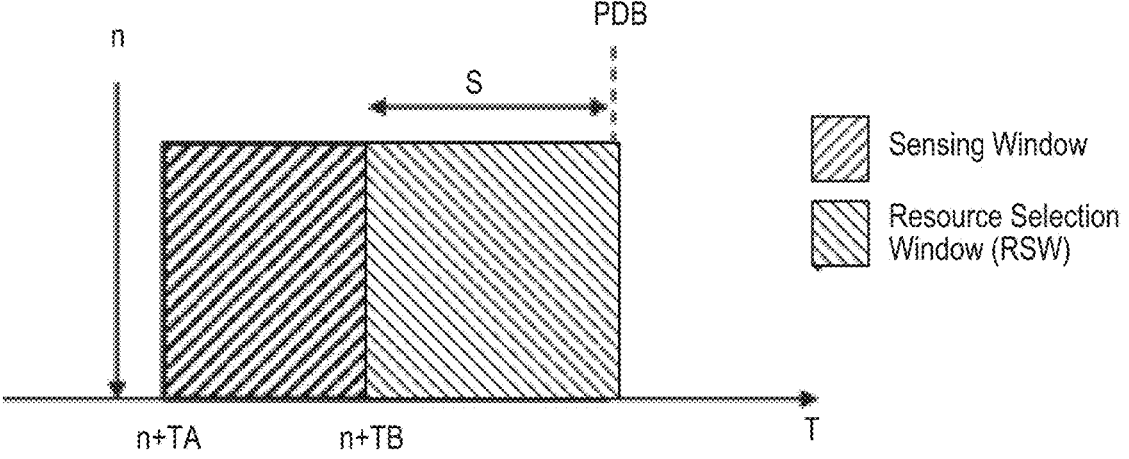

FIG. 5B shows an example of CPS. In this example, the UE performs sensing after an event at time n that triggers a transmission. Since the UE is in partial sensing operation, there is no sensing prior to time n, thereby reducing energy consumption. The sensing procedure consumes part of the PDB of the packet, however, which reduces the potential size of the resource selection window.

FIG. 5B shows the case where a UE performs contiguous partial sensing during a window size defined by [n+T$_A$, n+T$_B$] and the remaining part of the PDB (i.e., S) is allocated for the resource selection window. This behavior for the contiguous sensing window is aligned with some agreements made in 3GPP. In particular, when the UE performs only CPS in a mode 2 Tx pool with periodic reservation for another TB (sl-MultiReserveResource) disabled, and a resource (re)selection is triggered in slot n:

The resource selection window (RSW) is [n+$T_1$, n+$T_2$] where $T_2$ is defined based on step 1) of 3GPP TS 38.214 (Rel-16) Section 8.1.4. It is for further study (FFS) whether the resource selection window [n+$T_1$, n+$T_2$] should be confined within a set of periodic set of resources and its relationship with SL-DRX.

On the sensing window [n+$T_A$, n+$T_B$] for CPS:

Details of $T_A$ and $T_B$ values based on the agreements from previous RAN1 meetings FFS whether and how to define a minimum CPS window size, including (pre-) configurability and the case when $T_B$-$T_A$ is less than the minimum CPS window size.

FFS whether and how to define a maximum value/ upper bound for $T_B$ with respect at least to the minimum RSW size and the remaining PDB, including (pre-) configurability.

FFS how a set of candidate resource ($S_A$) is initialized considering candidate single-slot resources, including Whether and how to define a minimum size for the RSW (e.g., Rel-16 $T_{2min}$), including (pre-)configurability.

Whether the set $S_A$ is confined within a set of Y candidate slots within the RSW.

UE performs resource exclusion from the set $S_A$ based on at least all available sensing results and based on step 6) and 7) of 3GPP TS 38.214 (Rel-16) Section 8.1.4.

Note, re-evaluation and pre-emption checking in a resource pool with periodic reservation for another TB (sl-MultiReserveResource) disabled is considered separately.

FFS: Details on $T_1$.

As briefly mentioned above, the Rel-17 Work Item on NR SL includes the study and specification of SL DRX mechanism as one of its objectives. This includes defining SL DRX configurations and the corresponding UE procedure, specifying mechanisms to align sidelink DRX configurations among the UEs communicating with each other, and specifying mechanisms to align sidelink DRX configurations with Uu DRX configurations for an in-coverage UE.

3GPP RAN Working Group 2 has reached a number of agreements on the design of SL DRX. In general, similar to Uu DRX, SL DRX includes a set of timers that define the Active Time and a set of timers that define the Inactive Time. For example, the sl-drx-OnDuration timer defines the Active duration in each DRX cycle. Details of each timer and the related procedures for each casting type (i.e., unicast, groupcast, broadcast) are under discussion. Another feature of SL DRX under development in Rel-17 is a mechanism to align the Active Times of a transmitter UE and the intended receiver UEs. This will help maximize the energy savings of SL DRX.

SL DRX impacts the resource selection sensing procedure in SL mode 2 because a UE can only sense the resources during SL-DRX Active Time according to its SL-DRX configuration. However, it is under discussion in 3GPP whether the sensing operation is allowed during the SL-DRX Inactive Time, i.e., whether the UE can turn on its receiver outside its SL-DRX Active Time to perform sensing and if so, under what condition such operation is allowed.

Typically, when a packet arrives at the MAC and PHY layers of the UE, the packet will trigger a resource selection.

Each packet typically has a particular packet delay budget (PDB) that the resource selection protocol at the UE tries to fulfill. In other words, the UE will attempt to find resources to transmit the packet within the remaining PDB, after which the packet might be considered obsolete. As a result, when SL-DRX is configured, if the UE is only allowed to perform sensing during SL-DRX Active time, the UE may have little or no time for sensing before it must transmit the packet to fulfill the PDB.

Figure 6:
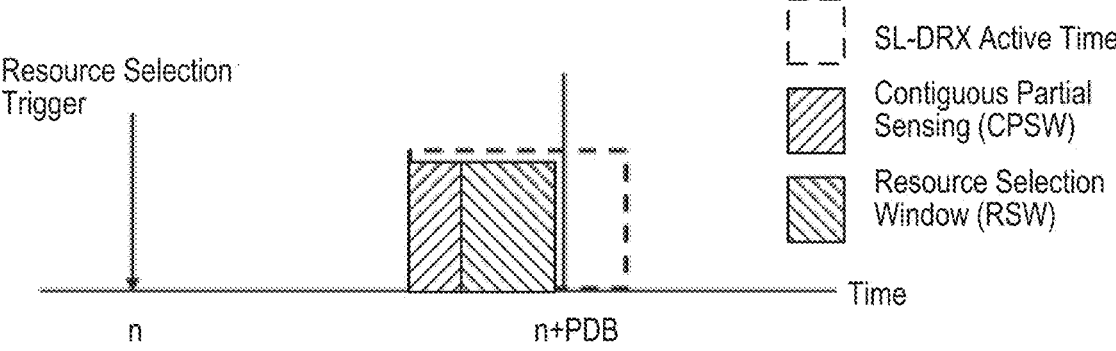
FIG. 6 illustrates an exemplary scenario involving CPS for a SL transmission associated with a packet delay budget (PDB).

FIG. 6 illustrates an exemplary scenario involving CPS for a SL transmission associated with a PDB. In this example, n denotes the time of resource selection trigger. Due to the large gap between n and the start of the SL DRX Active Time of the UE, the portion of the Active Time that can be used for sensing is too small for the sensing result to be meaningful. Moreover, the UE often needs to retain a time window, after the sensing, from which the resources are selected (denoted resource selection window, RSW, in FIG. 6).

Accordingly, embodiments of the present disclosure address these and other problems, issues, and/or difficulties by providing techniques for contiguous partial sensing to achieve a minimum sensing duration (e.g., minimum CPS window) regardless of SL DRX Active or Inactive Time associated with at UE's SL DRX configuration and when the PDB allows for it. For example, in case the overlap between a configured CPS window and a DRX Active time is less than a minimum CPS window requirement, the UE starts sensing outside the DRX active time to meet the minimum CPS window requirement.

Embodiments can provide various benefits and/or advantages. For example, embodiments can balance energy savings of SL-DRX with the need for reliable sensing to facilitate SL resource selection. More specifically, embodiments can improve the reliability of the SL transmission due to the extended sensing operation in case the UE is in DRX mode, reduce energy consumption compared to a full-sensing operation, and trigger extended sensing operation as needed. Also, embodiments provide a common UE behavior regarding the minimum contiguous sensing window. For instance, irrespective of SL-DRX configuration or UE implementation, the minimum contiguous sensing window is fulfilled improving the overall system performance, such as by reducing collisions caused by inadequate sensing.

In general, embodiments are described in the context of 3GPP SL communications directly between UEs rather than through an intermediate base station. Even so, underlying principles of the described embodiments are applicable to any kind of device-to-device (D2D) communications that involve sensing operations and DRX.

At a high level, embodiments provide a mechanism that enables a UE to perform sensing for a minimum contiguous sensing window size ($CPSW_{min}$), regardless of whether the UE is DRX Inactive Time or Active Time when the sensing should occur. In case the $CPSW_{min}$ cannot be guaranteed within the Active Time, the UE is allowed to extend its sensing window outside of the (pre-)configured SL-DRX Active Time.

In various embodiments, the value of $CPSW_{min}$ can be defined in specifications or (pre-) configured based on certain parameters, e.g., based on channel busy ratio (CBR) level or on the priority of the SL transmission. For example, a larger value of $CPSW_{min}$ can be associated with a higher priority level of the packet and/or with a higher CBR. Likewise, a lower priority level or lower CBR can be associated with a lower value of $CPSW_{min}$.

Additionally, a minimum size of the resource selection window (RSW) can be defined, denoted $RSW_{min}$. For example, $RSW_{min}$ can also be defined in the specifications or (pre-) configured based on packet priority and/or CBR.

Depending on the relation of the PDB, $CPSW_{min}$, $RSW_{min}$, and SL DRX Active Time of a UE, different rules for UE continuous partial sensing are applied, as discussed in more detail below. The rules can be configured by the network, or (pre) configured to the UE, or defined by a standard specification.

In some embodiments, $RSW_{min}$ is prioritized to be fulfilled within the SL DRX Active Time. Various rules can be applied in these embodiments, as described below.

Figures 7, 8, 9:
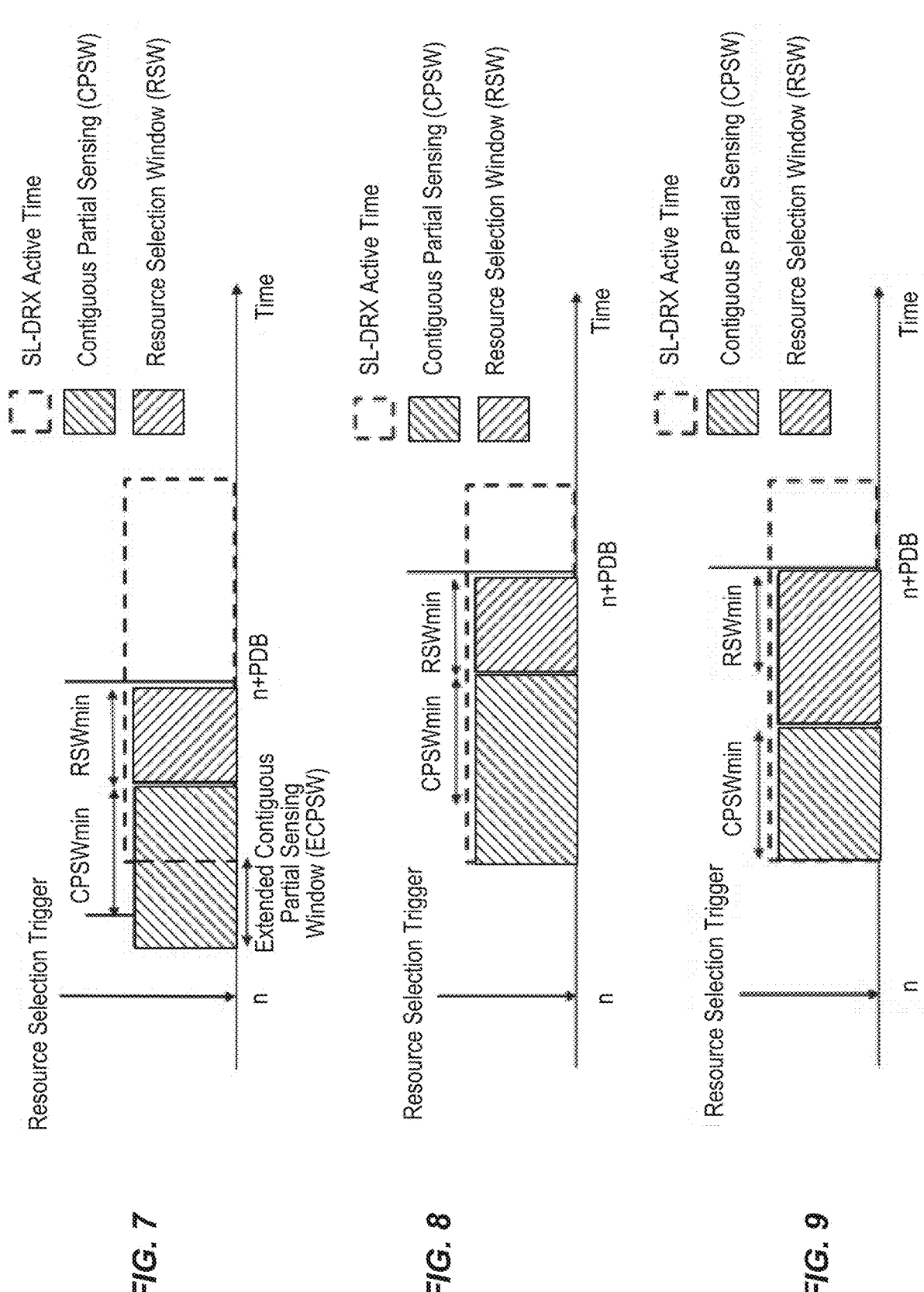
FIGS. 7-12 shows exemplary scenarios involving a SL-DRX active time, a minimum CPS window (CPSWmin), a minimum resource selection window (RSWmin), and a PDB, according to various embodiments of the present disclosure.

In case $CPSW_{min}$ cannot be fulfilled during SL-DRX Active Time, the CPS window is extended to SL-DRX Inactive time, up to a value that fulfills at least the $CPSW_{min}$. More specifically, when the Active Time before PDB expiration is smaller than $CPSW_{min}+RSW_{min}$ (potentially with some additional time for UE processing delay), the UE prioritizes operation to ensure that the $RSW_{min}$ is fulfilled and extends the sensing time to outside the Active Time so that the $CPSW_{min}$ is fulfilled. The extended sensing time is noted as Extended Contiguous Partial Sensing Window (ECPSW). The duration of ECPSW can at UE's discretion, so long as $CPSW_{min}$ is fulfilled. FIG. 7 shows an example scenario according to these embodiments.

In case $CPSW_{min}$ can be fulfilled during the SL-DRX Active time, the UE can perform sensing in several ways. In some embodiments, when the Active Time before PDB expiration is larger than $CPSW_{min}+RSW_{min}$ (potentially with some additional time for UE processing delays), the UE prioritizes fulfillment of $RSW_{min}$ and starts sensing when Active Time starts. FIG. 8 shows an example scenario according to these embodiments.

In other embodiments, when the Active Time before PDB expiration is larger than $CPSW_{min}+RSW_{min}$ (potentially with some additional time for UE processing delay), the UE prioritizes to ensure that the $CPSW_{min}$ is fulfilled and uses the remaining Active Time for the resource selection window. FIG. 9 shows an example scenario according to these embodiments.

Figures 10, 11, 12:
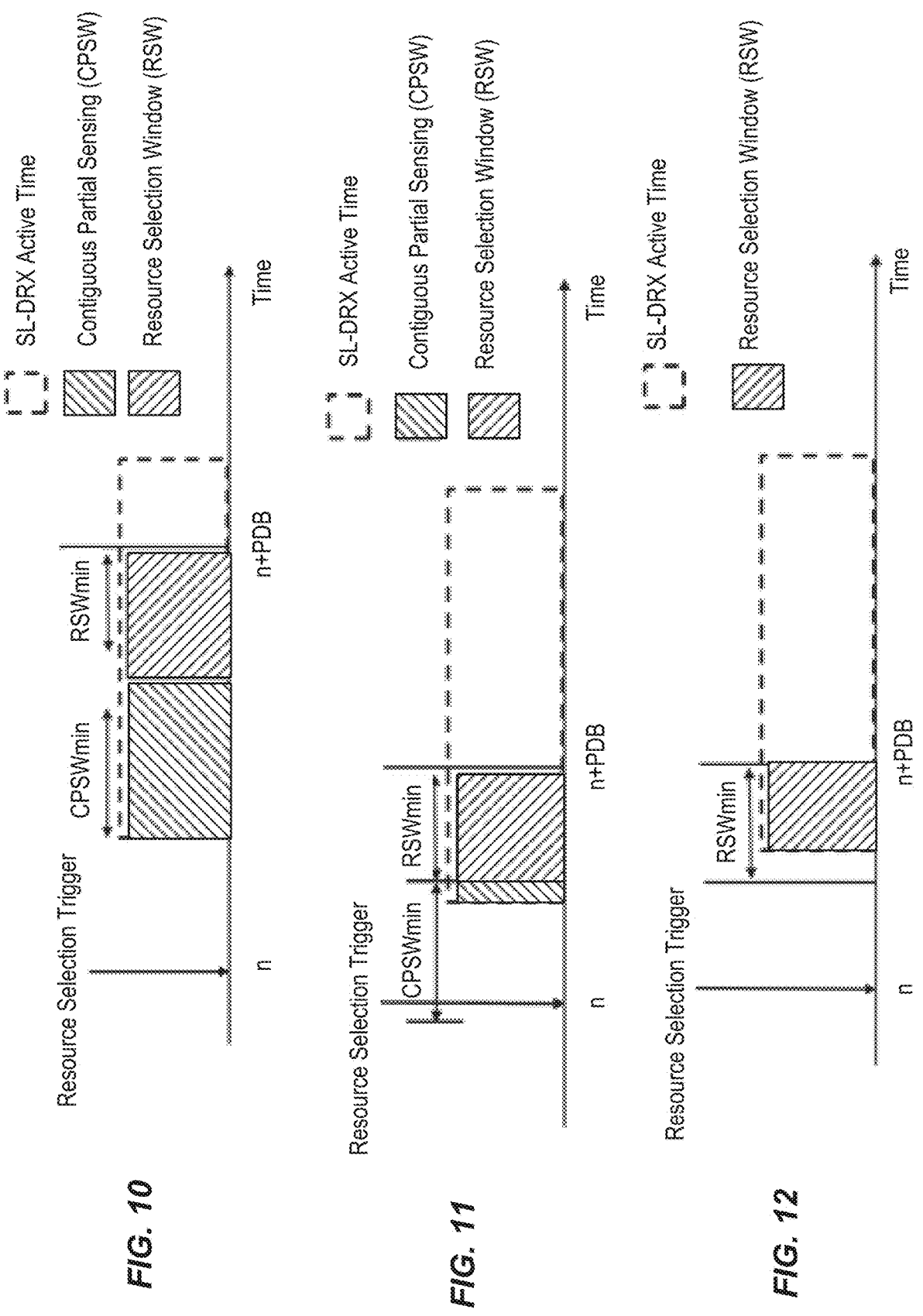

In other embodiments, when the Active Time before PDB expiration is larger than $CPSW_{min}+RSW_{min}$ (potentially with some additional time for UE processing delays), the UE prioritize use the Active Time in such a way that the actual CPSW and RSW are larger than the corresponding minimum values. FIG. 10 shows an example scenario according to these embodiments.

In some cases, $RSW_{min}$ can be fulfilled during the Active Time but $PDB<RSW_{min}+CPSW_{min}$. FIG. 11 shows an example scenario where $RSW_{min}$ can be fulfilled within the Active Time, but $CPSW_{min}$ cannot be fulfilled even with extended sensing outside Active Time. In these scenarios, the UE can perform resource selection in various ways. In some embodiments, the UE can perform random resource selection (e.g., without sensing) without additional condition. In other embodiments, the UE performs random resource selection with additional conditions, such as that the UE's channel occupancy ratio (CR) does not exceed a threshold and/or requirement.

FIG. 12 shows an example scenario where RSWmin cannot be fulfilled within the Active Time. When the UE encounters this condition, the UE can perform random resource selection (i.e., without sensing) for its SL transmission. Note that in this case the random resource selection is performed regardless of whether the CPSWmin can be fulfilled by extending sensing to outside the Active Time.

One motivation for this rule is that RSWmin needs to consider the DRX Active Time of the intended recipient of the UE's transmission. The recipient's DRX active time can be assumed to be generally aligned with the transmitter UE's DRX Active Time based on DRX Active Time alignment mechanisms discussed above. Consequently, it is not possible for the UE to select any resource outside the Active Time for transmission to the recipient UE.

Figure 13:
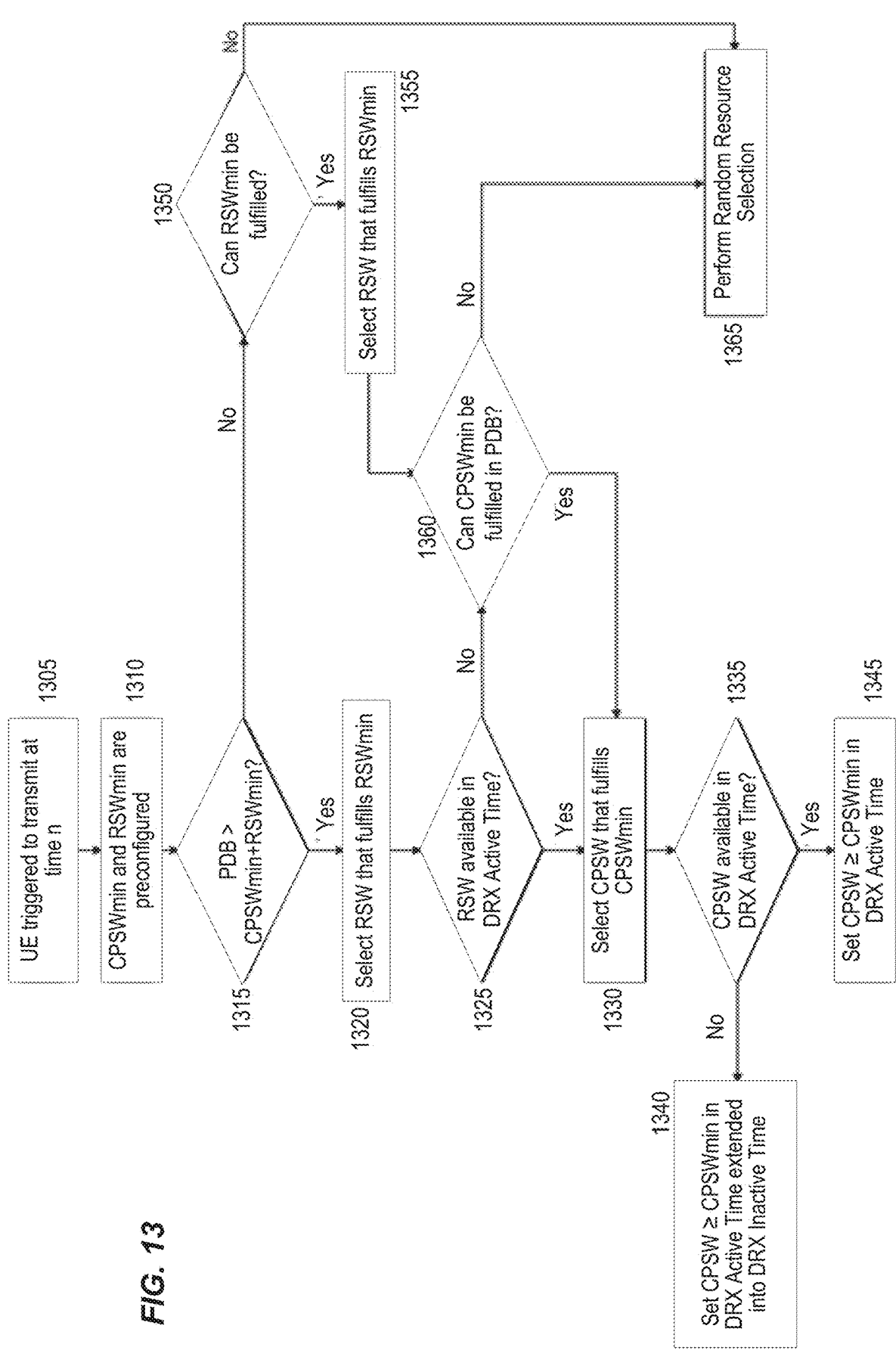
FIG. 13 shows a flowchart of an exemplary procedure for selection of resources for SL transmission in SL-DRX operation, according to various embodiments of the present disclosure.

FIG. 13 shows a flowchart of an exemplary procedure that embodies the various rules and/or conditions discussed above. Although the operations in FIG. 13 are given numerical labels, this is done to facilitate the following explanation rather than to imply or require a particular order of the operations, unless expressly stated otherwise.

Based on a transmission triggered at time n (block 1305) and the values of $CPSW_{min}$ and RSW min being defined and/or pre-configured (block 1310), the UE starts the procedure. In block 1315, the UE checks whether the remaining PDB for the transmission is large enough to accommodate both CPSWmin and RSWmin. In case of not being able to accommodate both, in block 1350 the UE checks whether at least $RSW_{min}$ can be fulfilled. If that is not possible, then the UE performs a random resource selection (block 1365) without considering whether the sensing window can be fulfilled.

On the other hand, if at least $RSW_{min}$ can be fulfilled, then in blocks 1355-1360 the UE selects a RSW that fulfills RSWmin and determines whether at least the $CPSW_{min}$ can be fulfilled in the remaining PDB. If not, the UE proceeds to block 1365 (discussed above) but if so, the UE proceeds to blocks 1330 where it selects a CPSW that fulfills $CPSW_{min}$. In block 1335, the UE determines whether the selected CPSW is available during SL-DRX Active Time. If so, the UE proceeds to block 1345 where it sets the selected $CPSW \geq CPSW_{min}$ during the SL-DRX Active Time. If not, then in block 1340 the UE sets the selected $CPSW \geq CPSW_{min}$ which in this case means that the CPSW is extended to outside the SL-DRX Active Time, i.e., extended into SL-DRX Inactive Time, e.g., as illustrated in other figures. Thus, if $CPSW_{min}$ cannot be fulfilled during the SL-DRX Active Time, then the sensing window, i.e. CPSW, is extended to the instants where the UE is in SL-DRX Inactive Time until fulfilling the $CPSW_{min}$ value (block 1340).

In case the UE determines in block 1315 that both CPSWmin and RSWmin can be fulfilled under the remaining PDB, the UE first selects a $RSW \geq RSW_{min}$ (block 1320) and determines whether the selected RSW is available during SL-DRX Active Time (block 1325). If so, the UE proceeds to blocks 1330-1345 (discussed above). On the other hand, if the selected $RSW \geq RSWmin$ is not available in SL-DRX Active Time, the UE determines whether CPSWmin can be fulfilled in the remaining PDB. If so, the UE proceeds to block 1330 discussed above. If not, the UE proceeds to block 1365 discussed above.

Various features of the embodiments described above correspond to various operations illustrated in FIG. 14, which shows an exemplary method (e.g., procedure) for a user equipment (UE) configured for sidelink (SL) communication with one or more other UEs in a wireless network. In other words, various features of the operations described below correspond to various embodiments described above.

The exemplary method shown in FIG. 14 can be performed by a UE (e.g., wireless device, etc.) such as described elsewhere herein. Furthermore, the exemplary method can be used cooperatively to provide various benefits, advantages, and/or solutions to problems described herein. Although FIG. 14 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 1410, where while operating in SL discontinuous reception (SL-DRX) comprising a plurality of active times, e.g. SL-DRX active times, during which the UE's SL receiver is active and a plurality of inactive times, e.g. SL-DRX inactive times, during which the UE's SL receiver is inactive, the UE can receive a trigger to select resources for a SL transmission. The UE can receive the trigger at a triggering instant n, also denoted a time n or slot n. For example, the UE can receive the trigger during an inactive time (such as shown in FIGS. 7-12) or during an active time.

The exemplary method can also include the operations of block 1420, where the UE can extend, or selectively extend, a contiguous partial sensing, CPS, window after the trigger at time n when a portion of an active time, e.g. an SL-DRX active time, is less than a first duration. For example, the CPS window may be extended to outside the active time. The portion of the active time corresponds to an overlap of the active time with a remaining PDB associated with the SL transmission, while the first duration comprises a minimum contiguous partial sensing window (CPSWmin) followed by a minimum resource selection window (RSWmin).

The extending of the CPS window when the portion of the active time is less than the first duration in block 1420 may thus be selectively performed e.g. in that there may be situations where the UE can refrain from extending the CPS window. Some examples are given below.

The exemplary method can also include the operations of block 1430, where the UE can perform at least one of the following during the portion of the active time: contiguous partial sensing (CPS) of resources, and selection of resources for the SL transmission.

In some embodiments, extending, or selectively extending, the CPS window in block 1430 can include the operations of sub-block 1431, where when the portion of the active time is less than the first duration, the UE can extend the CPS window to outside the active time into an inactive time, such that the portion of the active time is extended to at least the first duration. Here the portion of the active time is extended by the UE turning on its SL receiver outside its SL-DRX Active Time, i.e. when in SL-DRX Inactive Time, so that it can perform sensing. In this way, the time during which the UE's SL receiver is active increases, i.e. it is extended, and then the portion of time during which the UE's SL receiver is active that overlaps with the remaining PDB associated with the SL transmission is also extended. This overlap corresponds to, or is denoted, the extended portion of the active time. During the extended portion of the active time, CPS is performed for at least CPSWmin and selection of resources is performed after CPS for at least RSWmin. FIG. 7 shows an example of these embodiments.

In some embodiments, when the portion of the active time is not less than the first duration, CPS is performed for a duration of at least CPSWmin starting at the beginning of the portion of the active time while selection of resources is performed after CPS, for a duration of RSWmin until the end of the portion of the active time. FIG. 8 shows an example of these embodiments. In some of these embodiments, CPS is performed until the beginning of the selection of resources.

In other embodiments, when the portion of the active time is not less than the first duration, CPS is performed for a duration of CPSWmin starting at the beginning of the portion of the active time, while selection of resources is performed after CPS for a duration of at least RSWmin, until the end of the portion of the active time. FIG. 9 shows an example of these embodiments.

In other embodiments, when the portion of the active time is not less than the first duration, CPS is performed for a duration greater than CPSWmin, starting at the beginning of the portion of the active time. Also, selection of resources is performed after CPS for a duration greater than RSWmin, until the end of the portion of the active time. FIG. 10 shows an example of these embodiments.

In various embodiments described above, the selection of resources is based on the CPS (e.g., CPS results or outcome), both of which are performed in block 1430.

In some embodiments, extending, or selectively extending, the CPS window when the portion of the active time is less than the first duration in block 1420 can include the operations of sub-block 1422, where the UE can refrain from extending the CPS window when the trigger is received during an inactive time and a second duration between the time n and the beginning of the active time is less than CPSWmin. During the (non-extended) portion of the active time, CPS is not performed and resources for the SL transmission are selected randomly (e.g., in block 1430) from a pool of SL resources. The extending of the CPS window when the portion of the active time is less than the first duration in block 1420 may thus be selectively performed in that in case a second duration between the time n and the beginning of the active time is less than CPSWmin, e.g. in a situation when the trigger is received during an inactive time, the UE can refrain from extending the CPS window.

In other embodiments, extending, or selectively extending, the CPS window when the portion of the active time is less than the first duration in block 1420 can include the operations of sub-block 1423, where the UE can refrain from extending the CPS window when a second duration between the time n and the end of the remaining PDB is less than CPSWmin plus RSWmin. During the (non-extended) portion of the active time, CPS is not performed and resources for the SL transmission are selected randomly (e.g., in block 1430) from a pool of SL resources. FIG. 11 shows an example of these embodiments. In these embodiments, the extending of the CPS window when the portion of the active time is less than the first duration in block 1420 may thus be selectively performed in that in case a second duration between the time n and the end of the remaining PDB is less than CPSWmin plus RSWmin, the UE can refrain from extending the CPS window.

In variants of these embodiments, the random selection of resources for the SL transmission (e.g., in block 1430) is further based on the UE's channel occupancy ratio (CR) not exceeding a threshold.

In some embodiments, extending, or selectively extending, the CPS window when the portion of the active time is less than the first duration in block 1420 can include the operations of sub-block 1424, where the UE can refrain from extending the CPS window when the portion of the active time is less than RSWmin. During the portion of the active time, CPS is not performed and resources for the SL transmission are selected randomly from a pool of SL resources. In some of these embodiments, the selection of resources is performed randomly regardless of whether the CPS window can be extended such that CPS can be performed for at least CPSWmin. Thus, the extending of the CPS window when the portion of the active time is less than the first duration in block 1420 may be selectively performed in that when the portion of the active time is less than RSWmin, the UE can refrain from extending the CPS window.

In some embodiments, CPSWmin is based on one or more of the following: a packet priority level associated with the SL transmission, and a channel busy ratio (CBR) requirement. In some embodiments, RSWmin is based on one or more of the following: a packet priority level associated with the SL transmission, and a CBR requirement.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 15:
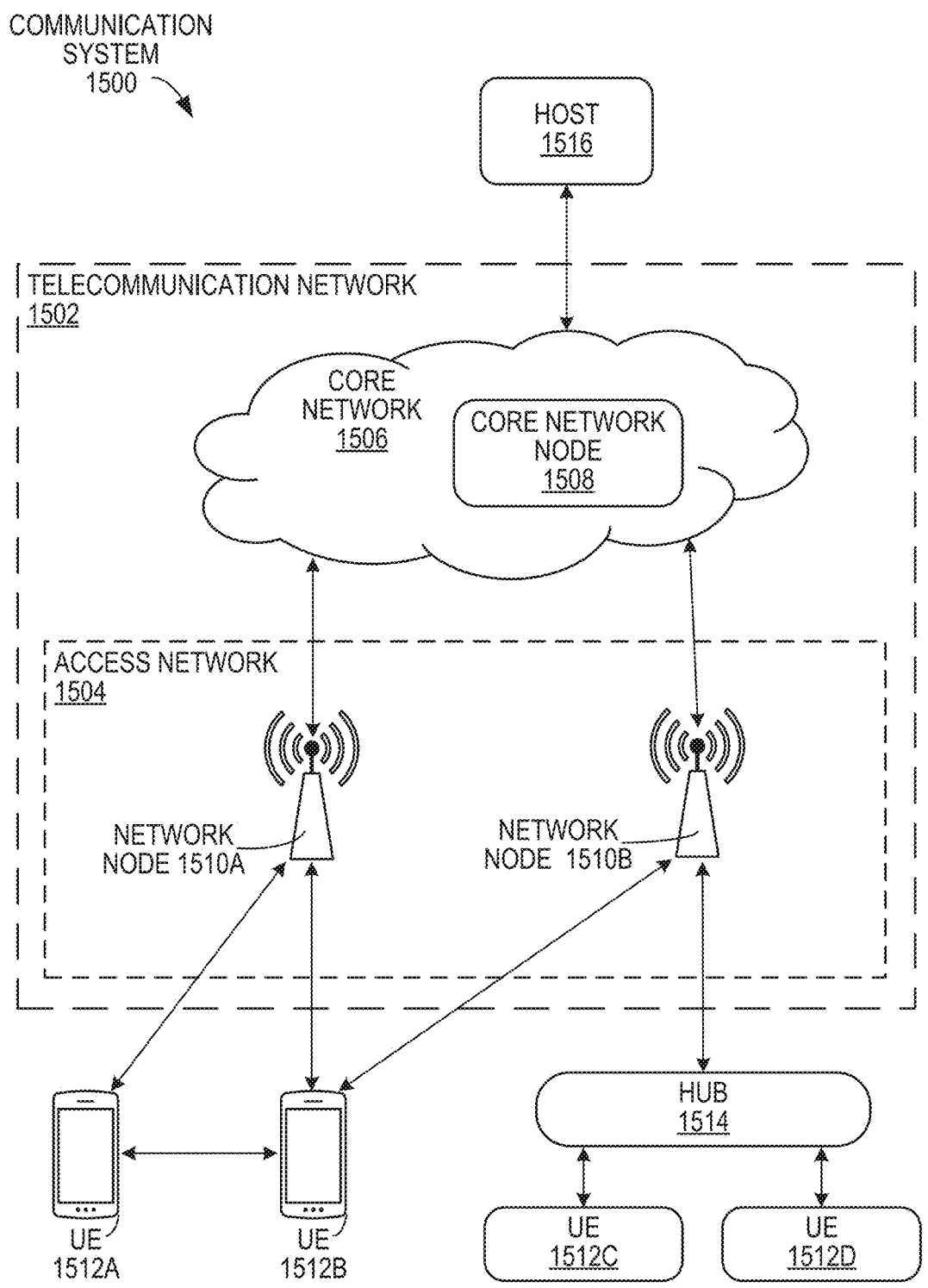
FIG. 15 shows a communication system according to various embodiments of the present disclosure.

FIG. 15 shows an example of a communication system 1500 in accordance with some embodiments. In the example, the communication system 1500 includes a telecommunication network 1502 that includes an access network 1504, such as a radio access network (RAN), and a core network 1506, which includes one or more core network nodes 1508. The access network 1504 includes one or more access network nodes, such as network nodes 1510a and 1510b (one or more of which may be generally referred to as network nodes 1510), or any other similar 3GPP access node or non-3GPP access point. The network nodes 1510 facilitate direct or indirect connection of UEs, such as by connecting UEs 1512a-d (one or more of which may be generally referred to as UEs 1512) to core network 1506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1500 may include any number of wired or wireless networks, network nodes, UEs, and/or any other components or systems that may facilitate or participate in the communication of data and/or signals whether via wired or wireless connections. The communication system 1500 may include and/or interface with any type of communication, telecommunication, data, cellular, radio network, and/or other similar type of system.

The UEs 1512 may be any of a wide variety of communication devices, including wireless devices arranged, configured, and/or operable to communicate wirelessly with the network nodes 1510 and other communication devices. Similarly, the network nodes 1510 are arranged, capable, configured, and/or operable to communicate directly or indirectly with the UEs 1512 and/or with other network nodes or equipment in the telecommunication network 1502 to enable and/or provide network access, such as wireless network access, and/or to perform other functions, such as administration in the telecommunication network 1502.

In the depicted example, the core network 1506 connects the network nodes 1510 to one or more hosts, such as host 1516. These connections may be direct or indirect via one or more intermediary networks or devices. In other examples, network nodes may be directly coupled to hosts. The core network 1506 includes one more core network nodes (e.g., core network node 1508) that are structured with hardware and software components. Features of these components may be substantially similar to those described with respect to the UEs, network nodes, and/or hosts, such that the descriptions thereof are generally applicable to the corresponding components of the core network node 1508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1516 may be under the ownership or control of a service provider other than an operator or provider of the access network 1504 and/or the telecommunication network 1502, and may be operated by the service provider or on behalf of the service provider. The host 1516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1500 of FIG. 15 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1502 is a cellular network that implements 3GPP standardized features. Accordingly, the telecommunications network 1502 may support network slicing to provide different logical networks to different devices that are connected to the telecommunication network 1502. For example, the telecommunications network 1502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1512 are configured to transmit and/or receive information without direct human interaction. For instance, a UE may be designed to transmit information to the access network 1504 on a predetermined schedule, when triggered by an internal or external event, or in response to requests from the access network 1504. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1514 communicates with the access network 1504 to facilitate indirect communication between one or more UEs (e.g., UE 1512c and/or 1512d) and network nodes (e.g., network node 1510b). In some examples, the hub 1514 may be a controller, router, content source and analytics, or any of the other communication devices described herein regarding UEs. For example, the hub 1514 may be a broadband router enabling access to the core network 1506 for the UEs. As another example, the hub 1514 may be a controller that sends commands or instructions to one or more actuators in the UEs. Commands or instructions may be received from the UEs, network nodes 1510, or by executable code, script, process, or other instructions in the hub 1514. As another example, the hub 1514 may be a data collector that acts as temporary storage for UE data and, in some embodiments, may perform analysis or other processing of the data. As another example, the hub 1514 may be a content source. For example, for a UE that is a VR headset, display, loudspeaker or other media delivery device, the hub 1514 may retrieve VR assets, video, audio, or other media or data related to sensory information via a network node, which the hub 1514 then provides to the UE either directly, after performing local processing, and/or after adding additional local content. In still another example, the hub 1514 acts as a proxy server or orchestrator for the UEs, in particular in if one or more of the UEs are low energy IoT devices.

The hub 1514 may have a constant/persistent or intermittent connection to the network node 1510b. The hub 1514 may also allow for a different communication scheme and/or schedule between the hub 1514 and UEs (e.g., UE 1512c and/or 1512d), and between the hub 1514 and the core network 1506. In other examples, the hub 1514 is connected to the core network 1506 and/or one or more UEs via a wired connection. Moreover, the hub 1514 may be configured to connect to an M2M service provider over the access network 1504 and/or to another UE over a direct connection. In some scenarios, UEs may establish a wireless connection with the network nodes 1510 while still connected via the hub 1514 via a wired or wireless connection. In some embodiments, the hub 1514 may be a dedicated hub—that is, a hub whose primary function is to route communications to/from the UEs from/to the network node 1510b. In other embodiments, the hub 1514 may be a non-dedicated hub—that is, a device which is capable of operating to route communications between the UEs and network node 1510b, but which is additionally capable of operating as a communication start and/or end point for certain data channels.

Figure 16:
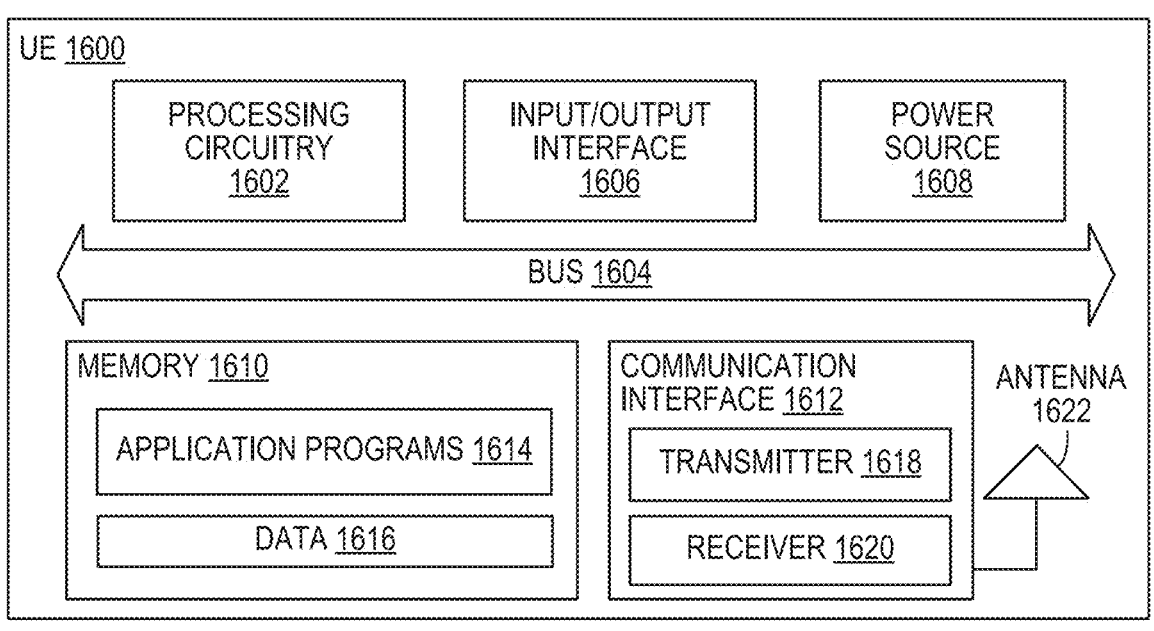
FIG. 16 shows a UE according to various embodiments of the present disclosure.

FIG. 16 shows a UE 1600 in accordance with some embodiments. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by 3GPP, including a narrow band internet of things (NB-IoT) UE, a machine type communication (MTC) UE, and/or an enhanced MTC (eMTC) UE.

UE 1600 may support device-to-device (D2D) communication, for example by implementing a 3GPP standard for sidelink (SL) communication, Dedicated Short-Range Communication (DSRC), vehicle-to-vehicle (V2V), vehicle-to-infrastructure (V2I), or vehicle-to-everything (V2X). In such case, certain components of UE 1600 (e.g., communication interface 1610) can include functionality needed to communicate directly with other UEs.

In other examples, UE 1600 may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1600 includes processing circuitry 1602 that is operatively coupled via a bus 1604 to an input/output interface 1606, a power source 1608, a memory 1610, a communication interface 1612, and/or any other component, or any combination thereof. Certain UEs may utilize all or a subset of the components shown in FIG. 16. The level of integration between the components may vary from one UE to another UE. Further, certain UEs may contain multiple instances of a component, such as multiple processors, memories, transceivers, transmitters, receivers, etc.

The processing circuitry 1602 is configured to process instructions and data and may be configured to implement any sequential state machine operative to execute instructions stored as machine-readable computer programs in the memory 1610. The processing circuitry 1602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1602 may include multiple central processing units (CPUs).

In the example, the input/output interface 1606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1608 is structured as a battery or battery pack. Other types of power sources, such as an external power source (e.g., an electricity outlet), photovoltaic device, or power cell, may be used. The power source 1608 may further include power circuitry for delivering power from the power source 1608 itself, and/or an external power source, to the various parts of the UE 1600 via input circuitry or an interface such as an electrical power cable. Delivering power may be, for example, for charging of the power source 1608. Power circuitry may perform any formatting, converting, or other modification to the power from the power source 1608 to make the power suitable for the respective components of the UE 1600 to which power is supplied.

The memory 1610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1610 includes one or more application programs 1614, such as an operating system, web browser application, a widget, gadget engine, or other application, and corresponding data 1616. The memory 1610 may store, for use by the UE 1600, any of a variety of various operating systems or combinations of operating systems.

The memory 1610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1610 may allow the UE 1600 to access instructions, application programs and the like, stored on transitory or non-transitory memory media, to off-load data, or to upload data. An article of manufacture, such as one utilizing a communication system may be tangibly embodied as or in the memory 1610, which may be or comprise a device-readable storage medium.

The processing circuitry 1602 may be configured to communicate with an access network or other network using the communication interface 1612. The communication interface 1612 may comprise one or more communication subsystems and may include or be communicatively coupled to an antenna 1622. The communication interface 1612 may include one or more transceivers used to communicate, such as by communicating with one or more remote transceivers of another device capable of wireless communication (e.g., another UE or a network node in an access network). Each transceiver may include a transmitter 1618 and/or a receiver 1620 appropriate to communicate with an access network and/or with other UEs (e.g., via optical, electrical, frequency allocations, and so forth). Moreover, the transmitter 1618 and receiver 1620 may be coupled to one or more antennas (e.g., antenna 1622) and may share circuit components, software or firmware, or alternatively be implemented separately.

In the illustrated embodiment, communication functions of the communication interface 1612 may include cellular communication (including uplink, downlink, and sidelink), Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1600 shown in FIG. 16.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 17:
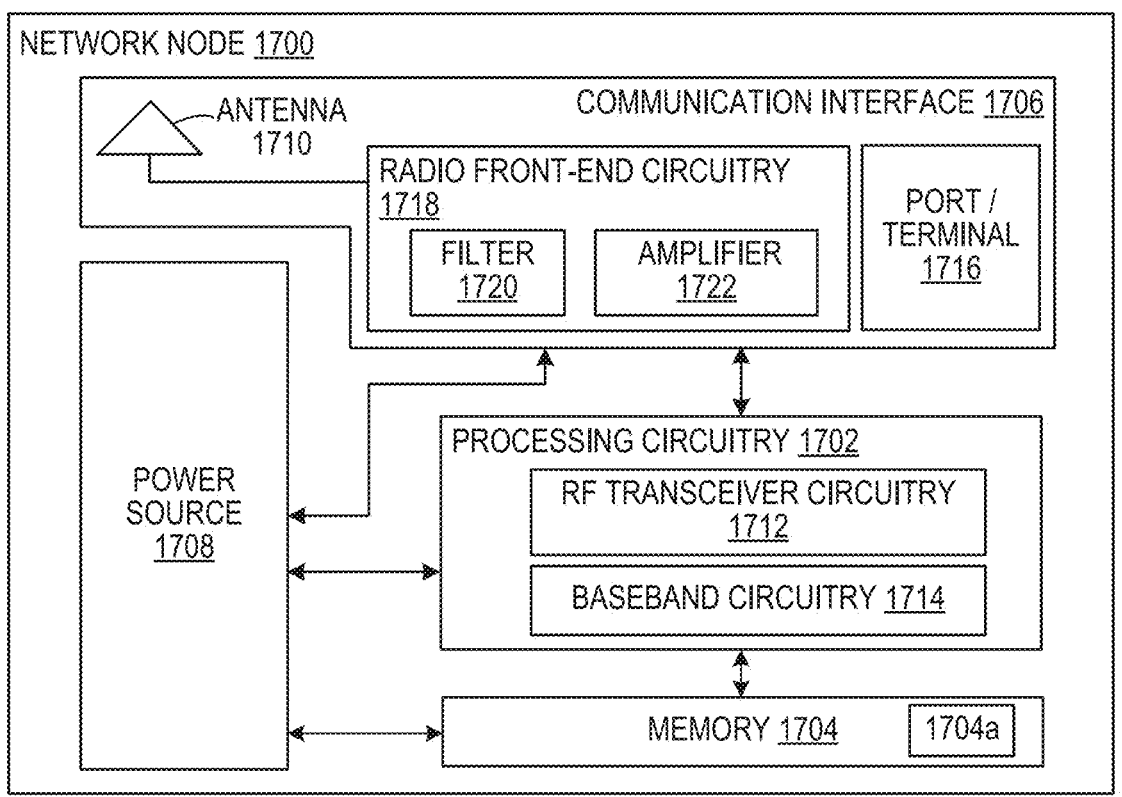
FIG. 17 shows a network node according to various embodiments of the present disclosure.

FIG. 17 shows a network node 1700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1700 includes a processing circuitry 1702, a memory 1704, a communication interface 1706, and a power source 1708. The network node 1700 may be composed of multiple physically separate components (e.g., a NodeB component and a RNC component, or a BTS component and a BSC component, etc.), which may each have their own respective components. In certain scenarios in which the network node 1700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1700 may be configured to support multiple radio access technologies (RATs). In such embodiments, some components may be duplicated (e.g., separate memory 1704 for different RATs) and some components may be reused (e.g., a same antenna 1710 may be shared by different RATs). The network node 1700 may also include multiple sets of the various illustrated components for different wireless technologies integrated into network node 1700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1700.

The processing circuitry 1702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1700 components, such as the memory 1704, to provide network node 1700 functionality.

In some embodiments, the processing circuitry 1702 includes a system on a chip (SOC). In some embodiments, the processing circuitry 1702 includes one or more of radio frequency (RF) transceiver circuitry 1712 and baseband processing circuitry 1714. In some embodiments, the radio frequency (RF) transceiver circuitry 1712 and the baseband processing circuitry 1714 may be on separate chips (or sets of chips), boards, or units, such as radio units and digital units. In alternative embodiments, part or all of RF transceiver circuitry 1712 and baseband processing circuitry 1714 may be on the same chip or set of chips, boards, or units.

The memory 1704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1702. The memory 1704 may store any suitable instructions, data, or information, including a computer program, software, an application including one or more of logic, rules, code, tables, and/or other instructions (collectively denoted computer program product 1704a) capable of being executed by the processing circuitry 1702 and utilized by the network node 1700. The memory 1704 may be used to store any calculations made by the processing circuitry 1702 and/or any data received via the communication interface 1706. In some embodiments, the processing circuitry 1702 and memory 1704 is integrated.

The communication interface 1706 is used in wired or wireless communication of signaling and/or data between a network node, access network, and/or UE. As illustrated, the communication interface 1706 comprises port(s)/terminal(s) 1716 to send and receive data, for example to and from a network over a wired connection. The communication interface 1706 also includes radio front-end circuitry 1718 that may be coupled to, or in certain embodiments a part of, the antenna 1710. Radio front-end circuitry 1718 comprises filters 1720 and amplifiers 1722. The radio front-end circuitry 1718 may be connected to an antenna 1710 and processing circuitry 1702. The radio front-end circuitry may be configured to condition signals communicated between antenna 1710 and processing circuitry 1702. The radio front-end circuitry 1718 may receive digital data that is to be sent out to other network nodes or UEs via a wireless connection. The radio front-end circuitry 1718 may convert the digital data into a radio signal having the appropriate channel and bandwidth parameters using a combination of filters 1720 and/or amplifiers 1722. The radio signal may then be transmitted via the antenna 1710. Similarly, when receiving data, the antenna 1710 may collect radio signals which are then converted into digital data by the radio front-end circuitry 1718. The digital data may be passed to the processing circuitry 1702. In other embodiments, the communication interface may comprise different components and/or different combinations of components.

In certain alternative embodiments, the network node 1700 does not include separate radio front-end circuitry 1718, instead, the processing circuitry 1702 includes radio front-end circuitry and is connected to the antenna 1710. Similarly, in some embodiments, all or some of the RF transceiver circuitry 1712 is part of the communication interface 1706. In still other embodiments, the communication interface 1706 includes one or more ports or terminals 1716, the radio front-end circuitry 1718, and the RF transceiver circuitry 1712, as part of a radio unit (not shown), and the communication interface 1706 communicates with the baseband processing circuitry 1714, which is part of a digital unit (not shown).

The antenna 1710 may include one or more antennas, or antenna arrays, configured to send and/or receive wireless signals. The antenna 1710 may be coupled to the radio front-end circuitry 1718 and may be any type of antenna capable of transmitting and receiving data and/or signals wirelessly. In certain embodiments, the antenna 1710 is separate from the network node 1700 and connectable to the network node 1700 through an interface or port.

The antenna 1710, communication interface 1706, and/or the processing circuitry 1702 may be configured to perform any receiving operations and/or certain obtaining operations described herein as being performed by the network node. Any information, data and/or signals may be received from a UE, another network node and/or any other network equipment. Similarly, the antenna 1710, the communication interface 1706, and/or the processing circuitry 1702 may be configured to perform any transmitting operations described herein as being performed by the network node. Any information, data and/or signals may be transmitted to a UE, another network node and/or any other network equipment.

The power source 1708 provides power to the various components of network node 1700 in a form suitable for the respective components (e.g., at a voltage and current level needed for each respective component). The power source 1708 may further comprise, or be coupled to, power management circuitry to supply the components of the network node 1700 with power for performing the functionality described herein. For example, the network node 1700 may be connectable to an external power source (e.g., the power grid, an electricity outlet) via an input circuitry or interface such as an electrical cable, whereby the external power source supplies power to power circuitry of the power source 1708. As a further example, the power source 1708 may comprise a source of power in the form of a battery or battery pack which is connected to, or integrated in, power circuitry. The battery may provide backup power should the external power source fail.

Embodiments of the network node 1700 may include additional components beyond those shown in FIG. 17 for providing certain aspects of the network node's functionality, including any of the functionality described herein and/or any functionality necessary to support the subject matter described herein. For example, the network node 1700 may include user interface equipment to allow input of information into the network node 1700 and to allow output of information from the network node 1700. This may allow a user to perform diagnostic, maintenance, repair, and other administrative functions for the network node 1700.

Figure 18:
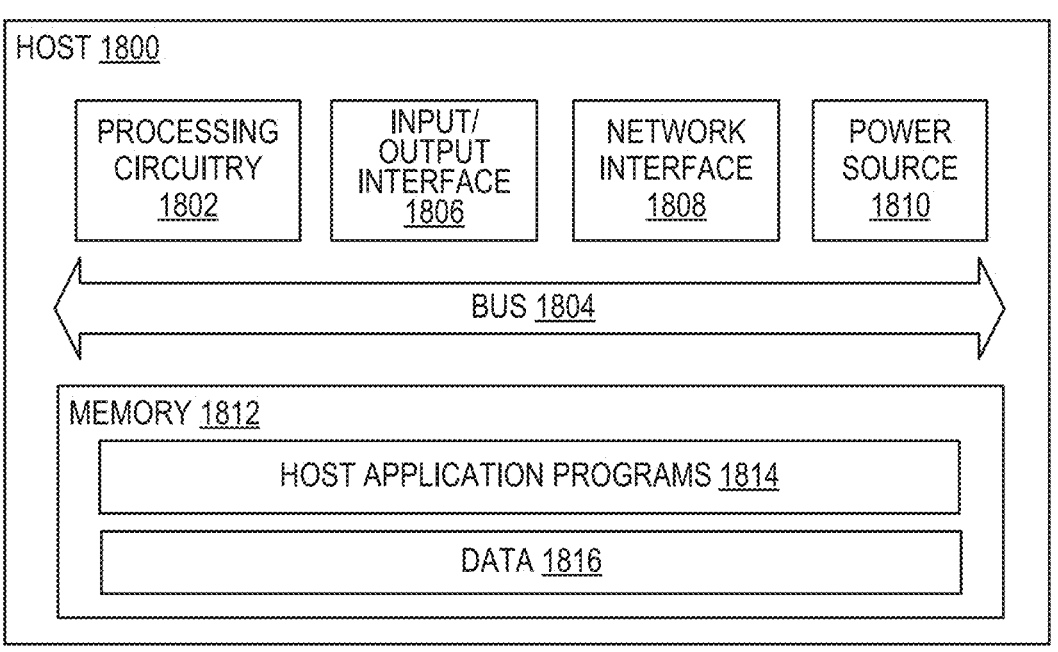
FIG. 18 shows host computing system according to various embodiments of the present disclosure.

FIG. 18 is a block diagram of a host 1800, which may be an embodiment of the host 1516 of FIG. 15, in accordance with various aspects described herein. As used herein, the host 1800 may be or comprise various combinations hardware and/or software, including a standalone server, a blade server, a cloud-implemented server, a distributed server, a virtual machine, container, or processing resources in a server farm. The host 1800 may provide one or more services to one or more UEs.

The host 1800 includes processing circuitry 1802 that is operatively coupled via a bus 1804 to an input/output interface 1806, a network interface 1808, a power source 1810, and a memory 1812. Other components may be included in other embodiments. Features of these components may be substantially similar to those described with respect to the devices of previous figures, such as FIGS. 16 and 17, such that the descriptions thereof are generally applicable to the corresponding components of host 1800.

The memory 1812 may include one or more computer programs including one or more host application programs 1814 and data 1816, which may include user data, e.g., data generated by a UE for the host 1800 or data generated by the host 1800 for a UE. Embodiments of the host 1800 may utilize only a subset or all of the components shown. The host application programs 1814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1814 may also provide for user authentication and licensing checks and may periodically report health, routes, and content availability to a central node, such as a device in or on the edge of a core network. Accordingly, the host 1800 may select and/or indicate a different host for over-the-top services for a UE. The host application programs 1814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 19:
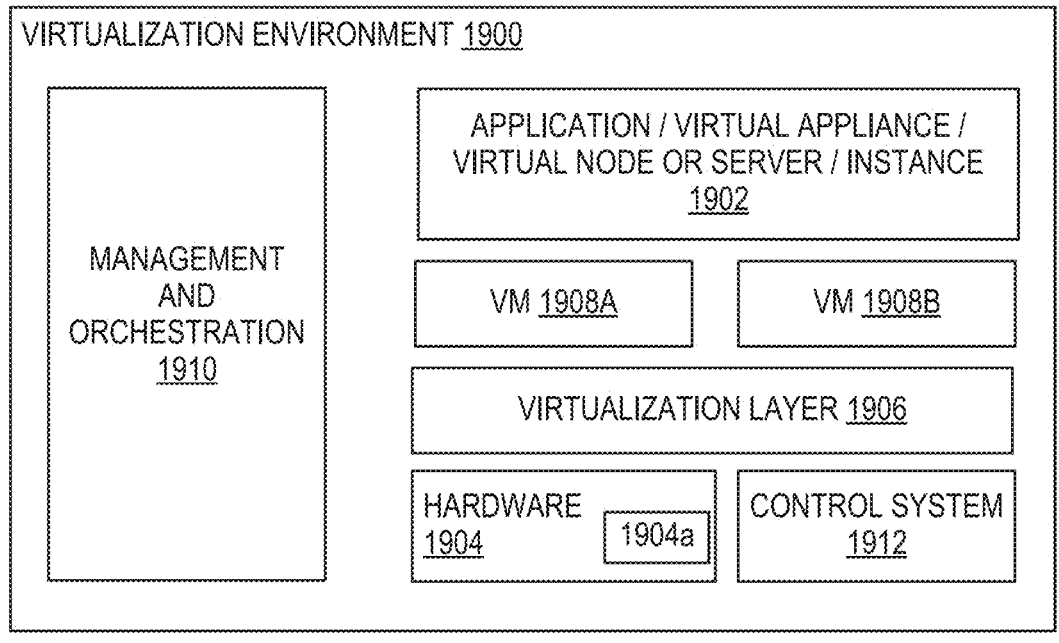
FIG. 19 is a block diagram of a virtualization environment in which functions implemented by some embodiments of the present disclosure may be virtualized.

FIG. 19 is a block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1904 includes processing circuitry, memory that stores software and/or instructions (collectively denoted computer program product 1904a) executable by hardware processing circuitry, and/or other hardware devices as described herein, such as a network interface, input/output interface, and so forth. Software may be executed by the processing circuitry to instantiate one or more virtualization layers 1906 (also referred to as hypervisors or virtual machine monitors (VMMs)), provide VMs 1908a and 1908b (one or more of which may be generally referred to as VMs 1908), and/or perform any of the functions, features and/or benefits described in relation with some embodiments described herein. The virtualization layer 1906 may present a virtual operating platform that appears like networking hardware to the VMs 1908.

The VMs 1908 comprise virtual processing, virtual memory, virtual networking or interface and virtual storage, and may be run by a corresponding virtualization layer 1906. Different embodiments of the instance of a virtual appliance 1902 may be implemented on one or more of VMs 1908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1908 may be a software implementation of a physical machine that runs programs as if they were executing on a physical, non-virtualized machine. Each of the VMs 1908, and that part of hardware 1904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1908 on top of the hardware 1904 and corresponds to the application 1902.

Hardware 1904 may be implemented in a standalone network node with generic or specific components. Hardware 1904 may implement some functions via virtualization. Alternatively, hardware 1904 may be part of a larger cluster of hardware (e.g., such as in a data center or CPE) where many hardware nodes work together and are managed via management and orchestration 1910, which, among others, oversees lifecycle management of applications 1902. In some embodiments, hardware 1904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1912 which may alternatively be used for communication between hardware nodes and radio units.

Figure 20:
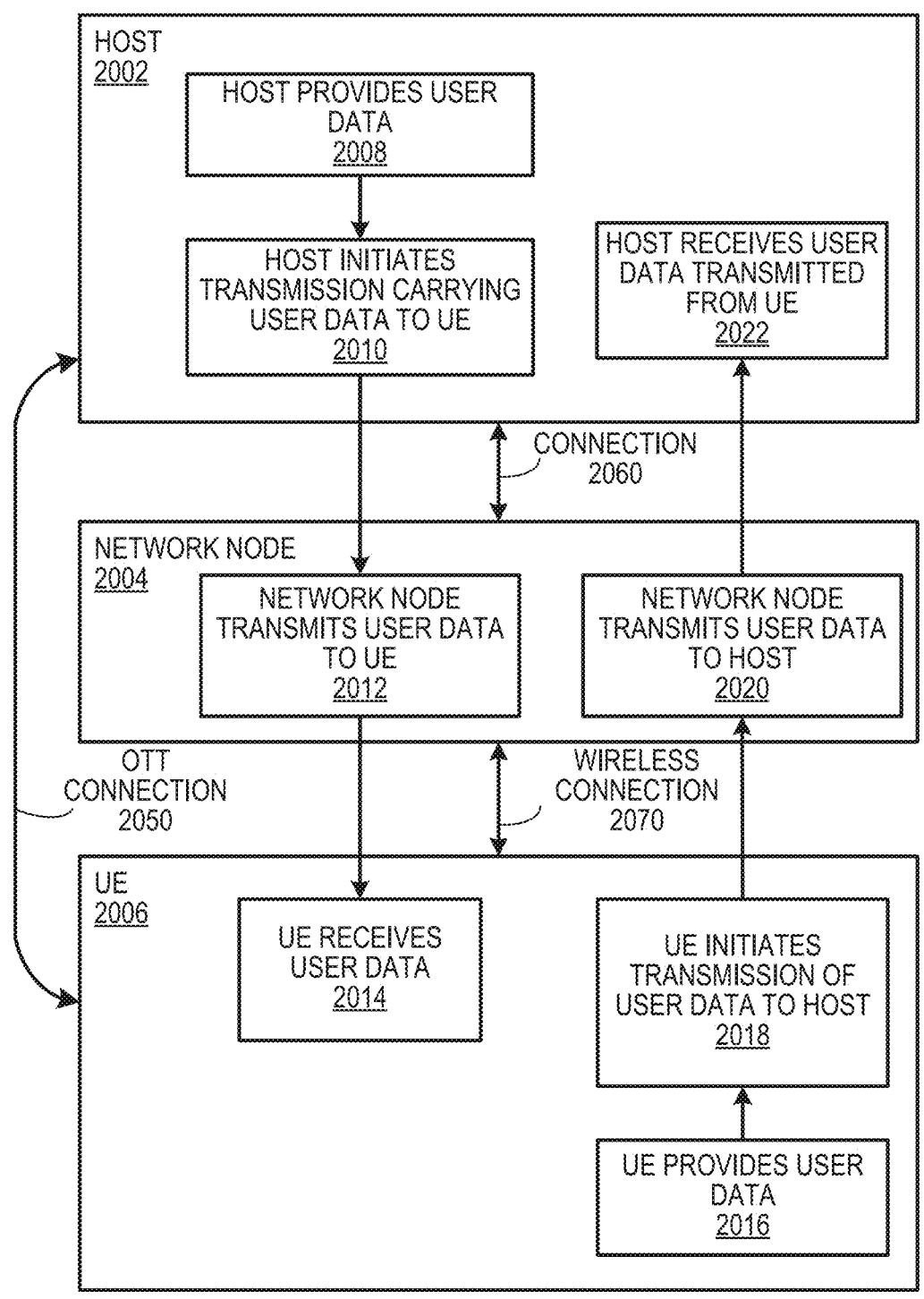
FIG. 20 illustrates communication between a host computing system, a network node, and a UE via multiple connections, at least one of which is wireless, according to various embodiments of the present disclosure.

FIG. 20 shows a communication diagram of a host 2002 communicating via a network node 2004 with a UE 2006 over a partially wireless connection in accordance with some embodiments. Example implementations, in accordance with various embodiments, of the UE (such as a UE 1512a of FIG. 15 and/or UE 1600 of FIG. 16), network node (such as network node 1510a of FIG. 15 and/or network node 1700 of FIG. 17), and host (such as host 1516 of FIG. 15 and/or host 1800 of FIG. 18) discussed in the preceding paragraphs will now be described with reference to FIG. 20.

Like host 1800, embodiments of host 2002 include hardware, such as a communication interface, processing circuitry, and memory. The host 2002 also includes software, which is stored in or accessible by the host 2002 and executable by the processing circuitry. The software includes a host application that may be operable to provide a service to a remote user, such as the UE 2006 connecting via an over-the-top (OTT) connection 2050 extending between the UE 2006 and host 2002. In providing the service to the remote user, a host application may provide user data which is transmitted using the OTT connection 2050.

The network node 2004 includes hardware enabling it to communicate with the host 2002 and UE 2006. The connection 2060 may be direct or pass through a core network (like core network 1506 of FIG. 15) and/or one or more other intermediate networks, such as one or more public, private, or hosted networks. For example, an intermediate network may be a backbone network or the Internet.

The UE 2006 includes hardware and software, which is stored in or accessible by UE 2006 and executable by the UE's processing circuitry. The software includes a client application, such as a web browser or operator-specific "app" that may be operable to provide a service to a human or non-human user via UE 2006 with the support of the host 2002. In the host 2002, an executing host application may communicate with the executing client application via the OTT connection 2050 terminating at the UE 2006 and host 2002. In providing the service to the user, the UE's client application may receive request data from the host's host application and provide user data in response to the request data. The OTT connection 2050 may transfer both the request data and the user data. The UE's client application may interact with the user to generate the user data that it provides to the host application through the OTT connection 2050.

The OTT connection 2050 may extend via a connection 2060 between the host 2002 and the network node 2004 and via a wireless connection 2070 between the network node 2004 and the UE 2006 to provide the connection between the host 2002 and the UE 2006. The connection 2060 and wireless connection 2070, over which the OTT connection 2050 may be provided, have been drawn abstractly to illustrate the communication between the host 2002 and the UE 2006 via the network node 2004, without explicit reference to any intermediary devices and the precise routing of messages via these devices.

As an example of transmitting data via the OTT connection 2050, in step 2008, the host 2002 provides user data, which may be performed by executing a host application. In some embodiments, the user data is associated with a particular human user interacting with the UE 2006. In other embodiments, the user data is associated with a UE 2006 that shares data with the host 2002 without explicit human interaction. In step 2010, the host 2002 initiates a transmission carrying the user data towards the UE 2006. The host 2002 may initiate the transmission responsive to a request transmitted by the UE 2006. The request may be caused by human interaction with the UE 2006 or by operation of the client application executing on the UE 2006. The transmission may pass via the network node 2004, in accordance with the teachings of the embodiments described throughout this disclosure. Accordingly, in step 2012, the network node 2004 transmits to the UE 2006 the user data that was carried in the transmission that the host 2002 initiated, in accordance with the teachings of the embodiments described throughout this disclosure. In step 2014, the UE 2006 receives the user data carried in the transmission, which may be performed by a client application executed on the UE 2006 associated with the host application executed by the host 2002.

In some examples, the UE 2006 executes a client application which provides user data to the host 2002. The user data may be provided in reaction or response to the data received from the host 2002. Accordingly, in step 2016, the UE 2006 may provide user data, which may be performed by executing the client application. In providing the user data, the client application may further consider user input received from the user via an input/output interface of the UE 2006. Regardless of the specific manner in which the user data was provided, the UE 2006 initiates, in step 2018, transmission of the user data towards the host 2002 via the network node 2004. In step 2020, in accordance with the teachings of the embodiments described throughout this disclosure, the network node 2004 receives user data from the UE 2006 and initiates transmission of the received user data towards the host 2002. In step 2022, the host 2002 receives the user data carried in the transmission initiated by the UE 2006.

One or more of the various embodiments improve the performance of OTT services provided to the UE 2006 using the OTT connection 2050, in which the wireless connection 2070 forms the last segment. More precisely, embodiments can balance energy savings of SL-DRX with the need for reliable sensing to facilitate SL resource selection. Embodiments can improve reliability of the SL transmission due to the extended sensing operation in case the UE is in DRX, reduce energy consumption compared to a full-sensing operation, and trigger extended sensing operation as needed. Embodiments also provide a common UE behavior regarding the minimum contiguous sensing window which must be met irrespective of SL-DRX configuration or UE implementation, thereby improving overall system performance by reducing collisions caused by inadequate sensing. In this manner, embodiments increases the value of OTT services that rely on SL communications to both end users and services providers.

In an example scenario, factory status information may be collected and analyzed by the host 2002. As another example, the host 2002 may process audio and video data which may have been retrieved from a UE for use in creating maps. As another example, the host 2002 may collect and analyze real-time data to assist in controlling vehicle congestion (e.g., controlling traffic lights). As another example, the host 2002 may store surveillance video uploaded by a UE. As another example, the host 2002 may store or control access to media content such as video, audio, VR or AR which it can broadcast, multicast or unicast to UEs. As other examples, the host 2002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2050 between the host 2002 and UE 2006, in response to variations in the measurement results. The measurement procedure and/or the network functionality for reconfiguring the OTT connection may be implemented in software and hardware of the host 2002 and/or UE 2006. In some embodiments, sensors (not shown) may be deployed in or in association with other devices through which the OTT connection 2050 passes; the sensors may participate in the measurement procedure by supplying values of the monitored quantities exemplified above, or supplying values of other physical quantities from which software may compute or estimate the monitored quantities. The reconfiguring of the OTT connection 2050 may include message format, retransmission settings, preferred routing etc.; the reconfiguring need not directly alter the operation of the network node 2004. Such procedures and functionalities may be known and practiced in the art. In certain embodiments, measurements may involve proprietary UE signaling that facilitates measurements of throughput, propagation times, latency and the like, by the host 2002. The measurements may be implemented in that software causes messages to be transmitted, in particular empty or 'dummy' messages, using the OTT connection 2050 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Embodiments of the techniques and apparatus described herein also include, but are not limited to, the following enumerated examples:

A1. A method for a user equipment (UE) configured for sidelink (SL) communication with one or more other UEs in a wireless network, the method comprising:
  while operating in SL discontinuous reception (SL-DRX) comprising a plurality of active times during which the UE's SL receiver is active and a plurality of inactive times during which the UE's SL receiver is inactive, receiving during one of the inactive times a trigger to select resources for a SL transmission;
  determining whether a portion of a next active time of the SL receiver is greater than a first duration comprising a minimum contiguous partial sensing window (CPSWmin) followed by a minimum resource selection window (RSWmin), wherein the portion corresponds to a remainder of a packet delay budget associated with the SL transmission;
  selectively extending the next active time based on the portion of the next active time being less than the first duration; and performing at least one of the following during the next active time: contiguous partial sensing (CPS) of resources, and selection of resources for the SL transmission.

A2. The method of embodiment A1, wherein:
  selectively extending the next active time comprises, when the portion of next active time is less than the first duration, extending the next active time to begin earlier such that the extended next active time is at least the first duration; and
  during the extended next active time, CPS is performed for at least CPSWmin starting at the beginning of the extended next active time, and selection of resources is performed for at least RSWmin following the CPS.

A3. The method of any of embodiments A1-A2, wherein when the portion of next active time is not less than the first duration:
  selection of resources is performed for at least RSWmin at the end of the portion of the next active time; and
  CPS is performed for at least CPSWmin starting at the beginning of the next active time.

A4. The method of embodiment A3, wherein CPS is performed until the beginning of the selection of resources.

A5. The method of any of embodiments A1-A2, wherein when the portion of next active time is not less than the first duration:
  CPS is performed for at least CPSWmin starting at the beginning of the next active time; and
  selection of resources is performed for at least RSWmin starting at the end of the CPS.

A6. The method of any of embodiments A1-A2, wherein when the portion of next active time is not less than the first duration:
  CPS is performed for greater than CPSWmin starting at the beginning of the next active time; and
  selection of resources is performed for greater than RSWmin starting at the end of the CPS.

A6a. The method of any of embodiments A3-A6, wherein selection of resources is based on the CPS.

A7. The method of any of embodiments A1-A6a, wherein:
  selectively extending the next active time comprises refraining from extending the next active time when the portion of the next active time is less than the first duration and a second duration between the trigger and the beginning of the next active time is less than CPSWmin; and
  during the next active time, CPS is not performed and resources for the SL transmission are selected randomly from a pool of SL resources.

A8. The method of embodiment A7, wherein the resources are selected for the SL transmission based on the UE's channel occupancy ratio (CR) not exceeding a threshold.

A9. The method of any of embodiments A1-A8, wherein:
  selectively extending the next active time comprises refraining from extending the next active time when the portion of the next active time is less than RSWmin; and
  during the next active time, CPS is not performed and resources for the SL transmission are selected randomly from a pool of SL resources.

A10. The method of embodiment A9, wherein the random resource selection is performed regardless of whether the next active time can be extended to begin earlier such that CPS can be performed for at least CPSWmin.

A11. The method of any of embodiments A1-A10, wherein CPSWmin is based on one or more of the following: a packet priority level associated with the SL transmission, and a channel busy ratio (CBR) requirement.

A12. The method of any of embodiments A1-A11, wherein $RSW_{min}$ is based on one or more of the following: a packet priority level associated with the SL transmission, and a channel busy ratio (CBR) requirement.

B1. A user equipment (UE) configured for sidelink (SL) communication with one or more other UEs in a wireless network, the UE comprising:

communication interface circuitry configured to communicate via SL with other UEs and with the wireless network, the communication interface circuitry including a SL receiver; and processing circuitry operably coupled with the communication interface circuitry, whereby the processing circuitry and the communication interface circuitry are configured to perform operations corresponding to any of the methods of embodiments A1-A12.

B2. A user equipment (UE) configured for sidelink (SL) communication with one or more other UEs in a wireless network, the UE being further configured to perform operations corresponding to any of the methods of embodiments A1-A12.

B3. A non-transitory, computer-readable medium storing computer-executable instructions that, when executed by processing circuitry of a user equipment (UE) configured for sidelink (SL) communication with one or more other UEs in a wireless network, configure the UE to perform operations corresponding to any of the methods of embodiments A1-A12.

B4. A computer program product comprising computer-executable instructions that, when executed by processing circuitry of a user equipment (UE) configured for sidelink (SL) communication with one or more other UEs in a wireless network, configure the UE to perform operations corresponding to any of the methods of embodiments A1-A12.

The invention claimed is:

1. A method performed by a user equipment (UE) configured for sidelink (SL) communication with one or more other UEs in a wireless network, the method comprising:

while operating in SL discontinuous reception (SL-DRX) comprising a plurality of active times during which the UE's SL receiver is active and a plurality of inactive times during which the UE's SL receiver is inactive, receiving, at a time n, a trigger to select resources for a SL transmission;

extending a contiguous partial sensing (CPS) window after the trigger at time n when a portion of an active time is less than a first duration, wherein:

the portion of the active time corresponds to an overlap of the active time with a remaining packet delay budget (PDB) associated with the SL transmission, and the first duration comprises a minimum contiguous partial sensing window (CPSWmin) followed by a minimum resource selection window (RSWmin); and performing at least one of the following during the portion of the active time: CPS of resources; and selection of resources for the SL transmission.

2. The method of claim 1, wherein:

extending the CPS window comprises, when the portion of the active time is less than the first duration, extending the CPS window to outside the active time, into an inactive time, such that the portion of the active time is extended to at least the first duration; and during the extended portion of the active time, CPS is performed for at least CPSWmin and selection of resources is performed after CPS for at least RSWmin.

3. The method of claim 1, wherein when the portion of the active time is not less than the first duration:

CPS is performed for a duration of at least CPSWmin starting at the beginning of the portion of the active time; and selection of resources is performed after CPS, for a duration of RSWmin until the end of the portion of the active time.

4. The method of claim 3, wherein CPS is performed until selection of resources begins.

5. The method of claim 1, wherein when the portion of the active time is not less than the first duration:

CPS is performed for a duration of CPSWmin, starting at the beginning of the portion of the active time; and selection of resources is performed after CPS for a duration of at least RSWmin, until the end of the portion of the active time.

6. The method of claim 1, wherein when the portion of the active time is not less than the first duration:

CPS is performed for a duration greater than CPSWmin, starting at the beginning of the portion of the active time; and selection of resources is performed after CPS for a duration greater than RSWmin, until the end of the portion of the active time.

7. The method of claim 3, wherein selection of resources is based on the CPS.

8. The method of claim 1, wherein:

extending the CPS window when the portion of the active time is less than the first duration comprises refraining from extending the CPS window when the trigger is received during an inactive time and a second duration between the time n and the beginning of the active time is less than CPSWmin; and during the portion of the active time, CPS is not performed and selection of resources for the SL transmission is performed randomly from a pool of SL resources.

9. The method of claim 1, wherein:

extending the CPS window when the portion of the active time is less than the first duration comprises refraining from extending the CPS window when a second duration between the time n and the end of the remaining PDB is less than CPSWmin plus RSWmin; and during the portion of the active time, CPS is not performed and selection of resources for the SL transmission is performed randomly from a pool of SL resources.

10. The method of claim 8, wherein the random selection of resources for the SL transmission is further based on the UE's channel occupancy ratio, CR, not exceeding a threshold.

11. The method of claim 1, wherein:

extending the CPS window when the portion of the active time is less than the first duration comprises refraining from extending the CPS window when the portion of the active time is less than RSWmin; and during the portion of the active time, CPS is not performed and selection of resources for the SL transmission is performed randomly from a pool of SL resources.

12. The method of claim 11, wherein during the portion of the active time, selection of resources is performed randomly regardless of whether the CPS window can be extended such that CPS can be performed for at least CPSWmin.

13. The method of claim 1, wherein CPSWmin is based on one or more of the following: a packet priority level associated with the SL transmission; and a channel busy ratio, CBR, requirement.

14. The method of claim 1, wherein RSWmin is based on one or more of the following: a packet priority level associated with the SL transmission; and a channel busy ratio (CBR) requirement.

15. A user equipment (UE) configured for sidelink (SL) communication with one or more other UEs in a wireless network, the UE comprising:

communication interface circuitry configured to communicate via SL with other UEs and with the wireless network, wherein the communication interface circuitry include a SL receiver; and processing circuitry operably coupled to the communication interface circuitry, whereby the processing circuitry and the communication interface circuitry are configured to:

while operating in SL discontinuous reception (SL-DRX) comprising a plurality of active times during which the SL receiver is active and a plurality of inactive times during which the SL receiver is inactive, receive, at a time n, a trigger to select resources for a SL transmission;

extend a contiguous partial sensing (CPS) window after the trigger at time n when a portion of an active time is less than a first duration, wherein:

the portion of the active time corresponds to an overlap of the active time with a remaining packet delay budget (PDB) associated with the SL transmission, and the first duration comprises a minimum contiguous partial sensing window (CPSWmin) followed by a minimum resource selection window (RSWmin); and perform at least one of the following during the portion of the active time: contiguous partial sensing (CPS) of resources; and selection of resources for the SL transmission.

16. The UE of claim 15, wherein the processing circuitry and the communication interface circuitry are further configured to, when the portion of the active time is less than the first duration:

extend the CPS window to outside the active time into an inactive time, such that the portion of the active time is extended to at least the first duration; and during the extended portion of the active time, perform CPS for at least CPSWmin and, after performing CPS, perform selection of resources for at least RSWmin.

17. The UE of claim 15, wherein the processing circuitry and the communication interface circuitry are further configured to, when the portion of the active time is not less than the first duration:

perform CPS for a duration of at least CPSWmin starting at the beginning of the portion of the active time; and after performing CPS, perform selection of resources for a duration of RSWmin, until the end of the portion of the active time.

18. The UE of claim 15, wherein the processing circuitry and the communication interface circuitry are further configured to, when the portion of the active time is not less than the first duration:

perform CPS for a duration of CPSWmin, starting at the beginning of the portion of the active time; and after performing CPS, perform selection of resources for a duration of at least RSWmin, until the end of the portion of the active time.

19. The UE of claim 15, wherein the processing circuitry and the communication interface circuitry are further configured to, when the portion of the active time is not less than the first duration:

perform CPS is performed for a duration greater than CPSWmin, starting at the beginning of the portion of the active time; and after performing CPS, perform selection of resources for a duration greater than RSWmin, until the end of the portion of the active time.

20. A non-transitory, computer-readable medium storing computer-executable instructions that, when executed by processing circuitry of a user equipment (UE) configured for sidelink (SL) communication with one or more other UEs in a wireless network, configure the UE to:

while operating in SL discontinuous reception (SL-DRX) comprising a plurality of active times during which the UE's SL receiver is active and a plurality of inactive times during which the UE's SL receiver is inactive, receive at a time n a trigger to select resources for a SL transmission;

extend a contiguous partial sensing (CPS) window after the trigger at time n when a portion of an active time is less than a first duration, wherein:

the portion of the active time corresponds to an overlap of the active time with a remaining packet delay budget (PDB) associated with the SL transmission, and the first duration comprises a minimum contiguous partial sensing window (CPSWmin) followed by a minimum resource selection window (RSWmin); and perform at least one of the following during the portion of the active time: CPS of resources; and selection of resources for the SL transmission.

* * * * *